(12) United States Patent
Gaddy et al.

(10) Patent No.: US 8,704,842 B1
(45) Date of Patent: Apr. 22, 2014

(54) SYSTEM AND METHOD FOR HISTOGRAM COMPUTATION USING A GRAPHICS PROCESSING UNIT

(71) Applicant: Spinella IP Holdings, Inc., Colts Neck, NJ (US)

(72) Inventors: William L. Gaddy, Milford, PA (US); Vidhya Seran, Irving, TX (US); Stephen Nowalk, North Huntingdon, PA (US); Yong Liu, Edison, NJ (US); Chidambaram Ramanathan, Monmouth Junction, NJ (US)

(73) Assignee: Spinella IP Holdings, Inc., Colts Neck, NJ (US)

( * ) Notice: Subject to any disclaimer, the term of this patent is extended or adjusted under 35 U.S.C. 154(b) by 0 days.

(21) Appl. No.: 13/944,159

(22) Filed: Jul. 17, 2013

(51) Int. Cl.
*G09G 5/00* (2006.01)

(52) U.S. Cl.
USPC .......................................................... 345/586

(58) Field of Classification Search
CPC ............................ G09G 5/14; G09G 2340/125

USPC .................................................. 345/546, 586
See application file for complete search history.

(56) References Cited

U.S. PATENT DOCUMENTS

2010/0141666 A1* 6/2010 Christopher et al. ......... 345/520

* cited by examiner

*Primary Examiner* — Edward Martello
(74) *Attorney, Agent, or Firm* — Lowenstein Sandler LLP

(57) ABSTRACT

A method and system for obtaining a histogram and related statistical values from a data set of texels is disclosed. A processing device receives from a first buffer, a data set of texels. The data set has a dimensionality D of at least two and each texel contains a value. The processing device sorts the data set into a point list of coordinates, wherein a point in the point list corresponds to a texel location in the data set. The processing device reduces the dimensionality of the point list by arranging points in the point list according to an N−1 dimensional dominancy. The processing device performs a raster operation on each associated value of the arranged points to obtain at least one value. The processing device is to output the at least one value to a second buffer. The processing device may be a graphics processing unit.

24 Claims, 33 Drawing Sheets

SYSTEM AND METHOD FOR HISTOGRAM COMPUTATION USING A GRAPHICS PROCESSING UNIT

TECHNICAL FIELD

Embodiments of the present disclosure relate to image processing, and, more particularly, to the field of histogram computations and other statistics computations.

BACKGROUND

Histogram computations and related statistical operations performed on a D-dimensional numerical set, S, such as min(S), max(S), mean $\bar{X}$(S), standard deviation σ(S), and mode(S), are common operations employed in image processing systems. Histogram computations have also been employed in problems involving parallel execution, such as parallel execution of large sets, rapid throughput, or both. By way of example, the system and method taught in U.S. Pat. No. 8,451,384 utilizes multiple histograms and their intersection to provide one of several measures for shot change detection in high-resolution video. Unfortunately, efficiently performing these types of computations while leveraging massively multi-parallel hardware, which may include graphics processing units (GPU) and massively multi-core SIMD or MIMD vector processing systems, is lacking.

Early attempts to perform GPU-based histogram computations suffered from poor performance with respect to recursive reduction operations, for example, as taught in U.S. Pat. No. 7,889,922 (hereinafter the '922 patent). Such recursive reduction operations require large repeated recursions with small tile-size, or suffer from cache misses with large tile size and fewer recursions. This limits the utility and practical performance of recursive reduction operations for large data sets as taught by the '922 patent.

Other prior art methods avoid recursion by performing reduction in a single step using a feature of current GPU hardware, namely the reading of texture buffer values within a vertex shader, as disclosed in Scheuermann, T. and Hensley, J., 2007, "Efficient histogram generation using scattering on GPUs," *Proceedings of the 2007 symposium on Interactive 3D graphics and games* (I3D '07), pp. 33-37 (hereinafter "Scheuermann and Hensley"). The reading of texture buffer values within a vertex shader as taught by Scheuermann and Hensley permits "scatter" operations, e.g., a destination write location is not fixed but variable based upon decisions that rely on input texture.

In contrast, the recursive reduction operations taught in the '922 patent only permit "gather" operations, where a write operation location is fixed, but a read operation is variable.

It should be noted that while the method of Scheuermann and Hensley exhibits good parallelism and a further benefit of scaling performance on only the input data set size and not the histogram bin size, it suffers from an inversion of performance wherein large bin sizes exhibit superior performance to smaller bin sizes. This unpredictability is due to serialization of memory write requests to a GPU cache, especially in data sets with high modalities, rendering such methods and systems wholly unsuitable for real-time stream processing applications where predictability is a necessity.

In Nugteren, Cedric, et al., "High performance predictable histogramming on gpus: exploring and evaluating algorithm trade-offs," *Proceedings of the Fourth Workshop on General Purpose Processing on Graphics Processing Units*, ACM, 2011 (hereinafter "Nugteren"), two histogram computation methods are disclosed that address the cache-collision problem, but both employ a proprietary API (CUDA) that is only available from a single vendor of GPU hardware. Further, these prior art methods direct themselves to a singular purpose, namely, the computation of a binned histogram using a GPU, and not any allied statistical functions. Additionally, for image and video processing, histogram functions have typically been performed off-GPU, such as on the CPU, introducing pipeline stalls and wait-states. These stalls render such systems and methods unsuitable for real-time image and video processing.

Accordingly, what would be desirable, but has not yet been provided, is a high throughput, memory efficient, GPU-vendor-independent, and flexible histogram and statistical method and system for computing histograms that exhibits consistent performance.

BRIEF SUMMARY OF THE INVENTION

A system and method according to the present invention performs the functions of histogram computation, and enables finding one or more of the following from a set: minimum value, maximum value, standard deviation of the set, and finding the Nth mode of a set. While the preferred embodiment of the present invention is realized on a GPU, those skilled in the art will appreciate that the invention has multiple uses outside of image and video processing functions. Any problem requiring the statistical or histogram analysis of any large D-dimensional data set will benefit. For this additional reason, an efficient GPU histogram computation system and method provides attendant benefits to any real-time or other time-sensitive image or video processing system or method that runs on a GPU.

More particularly, the above-described problems are addressed and a technical solution is achieved in the art by providing method and system for obtaining a histogram and related statistical values from a data set of texels. A processing device receives from a first buffer, a data set of texels. The data set has a dimensionality D of at least two and each texel contains a value. The processing device sorts the data set into a point list of coordinates, wherein a point in the point list corresponds to a texel location in the data set. The processing device reduces the dimensionality of the point list by arranging points in the point list according to an N−1 dimensional dominancy. The processing device performs a raster operation on each associated value of the arranged points to obtain at least one value. The processing device outputs the at least one value to a second buffer. The processing device may be a graphics processing unit. The steps of sorting, reducing, performing, and outputting may be repeated until D is one.

In an example, sorting the data set may comprise generating a vertex buffer with individual vertices for each texel location. Reducing the dimensionality of the point list may comprise performing a vertex shader pass to inform a subsequent pixel shader pass of destination bin locations for performing the raster operation. Performing the raster operation may comprise performing at least one of a replacement raster operation, an additive raster operation, a minimum raster operation, or a maximum raster operation using a pixel shader.

In an example, the outputted the at least one value may be at least one of a histogram of the data set, a maximum value of the data set, the minimum value of the data set, a summation value of the data set, a mean, median, or mode value of a data set, a standard deviation value of the data set, a location of the minimum value of a data set, or a location of the maximum value of a data set.

In an example, the data set of texels may be received in the first buffer from two-dimensional or three-dimensional still images or video.

The above-described problems are addressed and a technical solution is achieved in the art by providing method and system for obtaining a histogram and related statistical values from a data set of texels. A processing device receives, from a first buffer, a two-dimensional data set of texels, where each texel in the data set is associated with a value. The processing device sorts the data set from the first buffer into a point list of coordinates in a second buffer, where a point in the point list corresponds to a texel location in the data set. The processing device reads values from the second buffer and outputting column locations to a third buffer with a width equal to a first size and height equal to a second size. The processing device increments values by one in the column texel locations in the third buffer using an additive raster operation to obtain at least one value. The processing device outputs the at least one value to a fourth buffer.

In an example, the first size and the second size correspond to a histogram bin size.

In an example, outputting column locations to a third buffer with a width equal to a first size and height equal to a second size may further comprise translating to a new coordinate system the ing position coordinates of texels in the second buffer by writing to texel locations in the third buffer with columnar locality such that a vertical coordinate of a position coordinate of a texel located in the second buffer is translated to a new coordinate system according to a value of an associated texel texture located in the first buffer. Incrementing values may comprise incrementing a texel value of the third buffer by one for every texel location that the position coordinate directs it to operate upon.

In an example, the processing device may output, to the fourth buffer, bin texel locations with a height of 1 and width equal to a final histogram bin size. The processing device may increment by one the values in the fourth buffer using the additive raster operation to obtain a histogram.

In an example, the first size may correspond to a width of the first buffer and the second size corresponds to height equal to one. The processing device may output to the fourth buffer bin texel locations with a height of one and width equal to one.

In an example, performing a raster operation may comprise performing at least one of a replacement raster operation, an additive raster operation, a minimum raster operation, or a maximum raster operation.

In an example, the processing device may replace values in the fourth buffer using a minimum raster operation to obtain a minimum value of the data set. The processing device may replace values in the fourth buffer using a summation raster operation to obtain a summation value of the data set. Replacing values in the fourth buffer may further comprise multiplying the values in the fourth buffer by one divided by a size of the data set to obtain a mean of the data set.

The above-described problems are addressed and a technical solution is achieved in the art by providing method and system for obtaining the location of a minimum value or a maximum value within a data set of texels. A processing device computes a minimum value or a maximum value of a two-dimensional data set of texels. The processing device receives, from a first buffer, the two-dimensional data set of texels, where each texel in the data set is associated with a value. The processing device sorts the data set from the first buffer into a point list of coordinates in a second buffer, where a point in the point list corresponds to a texel location in the data set. The processing device reads a texel value from the second buffer and outputs a single texel location and x and y values to a third buffer if the texel value is equal to the minimum value and a single out of range texel location if the texel value is more than the minimum value. The processing device reads x and y values from the second buffer and copies these values to x and y values of the third buffer via a replace raster operation to compute a location of minimum value or a maximum value within the data set.

DETAILED DESCRIPTION

The method described herein provides a common, efficient system and method for performing the foregoing computations that addresses multiple existing SIMD and MIMD architectures, while exhibiting much reduced memory bandwidth requirements and less computational intensity than those taught in the prior art.

In the following description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

As used herein, a vertex shader refers to a logical function of a GPU that operates on a vertex buffer which in turn contains one or more coordinates in 2D or 3D space. A vertex buffer refers to a buffer uploaded from the host system to the GPU that contains one or more data pertaining to vertices, such as location, normal vector, color, and other user-definable data. A pixel shader refers to a logical kernel function of a GPU that operates in parallel upon texels in a texture buffer as directed by the vertex shader output vertices with no particular ordering of execution. A texel refers to a texture element within a texture buffer. A texture buffer refers to an array of texels, much as a picture can be represented by an array of pixels. For brevity and clarity of teaching the invention, a treatise on GPU memory architecture will not be included. A good treatise with respect to the memory subsystem architecture(s) of modern GPUs and other aspects of modern GPU architectures may be found in Randima Fernando, 2004, "GPU Gems: Programming Techniques, Tips and Tricks for Real-Time Graphics," incorporated herein by reference. Further, Nugteren illustrates the memory access patterns of GPU histogram computation, and is incorporated herein by reference.

Although described in terms of GPUs, embodiments of the present invention can be implemented on older GPU hardware, which does not support geometry shaders and other newer tessellation features, nor employ APIs that involve operations on vertex and pixel or fragment shaders and fixed-function pipelines. The terms pixel shader and fragment shader are interchangeable, but for clarity of description pixel shader will be used herein.

Figure 1:
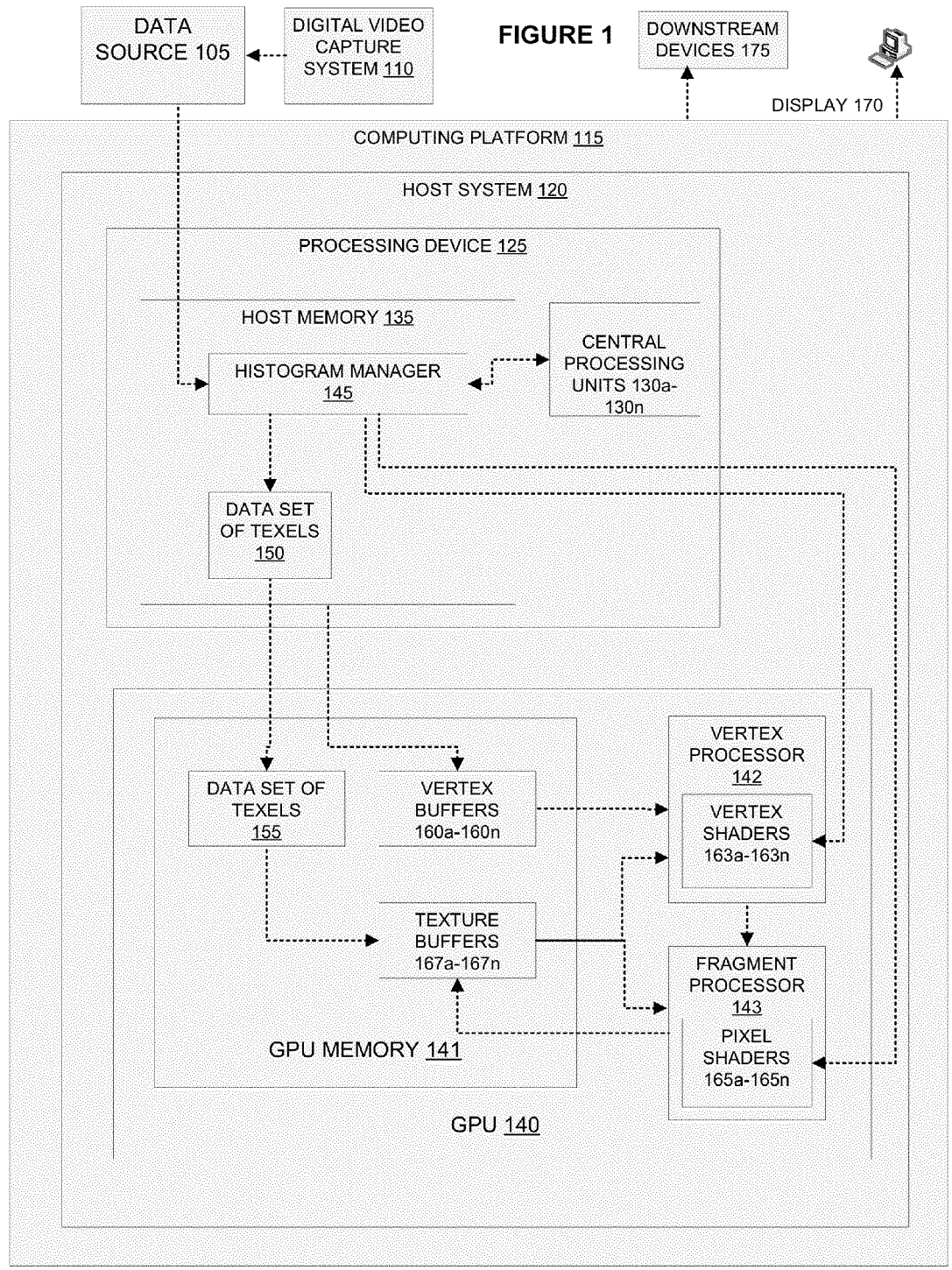
FIG. 1 is a block diagram that illustrates an example computing system in which examples of the present disclosure may operate.

FIG. 1 is a block diagram of an example computing system 100 for obtaining a histogram and related statistical values from a data set of texels in which examples of the present disclosure may operate. By way of non-limiting example, the computing system 100 receives data from one or more data sources 105, such as a video camera or an on-line storage device or transmission medium. The computing system 100 may also include a digital video capture system 110 and a computing platform 115. The digital video capturing system 110 processes streams of digital video, or converts analog video to digital video, to a form which can be processed by the computing platform 115 as data source 105. The computing platform 115 comprises a host system 120 which may comprise, for example, a processing device 125, such as one or more central processing units 130a-130n. The processing device 125 is coupled to a host memory 135. The processing device may further implement a graphics processing unit 140 (GPU). In one example, the GPU 140 may be implemented on a separate physical chip from one or more of the central processing units 130a-130n. In another example, the GPU 140 may be collocated on the same physical chip or logical device as the central processing units 130a-130n. in what is known as an accelerated processing unit or APU, as found on mobile phones and tablets. Separate GPU and CPU functions may be found on computer server systems where the GPU is a physical expansion card, and personal computer systems and laptops. GPUs/APUs may provide for high-throughput histogram and statistical computation on these and future devices.

The GPU 140 may comprise a GPU memory 141, a vertex processor 142, and a fragment processor 143. In an example, the host memory 135 and the GPU memory 141 may implemented on separate physical chips, or may be collocated on the same physical chip(s) or logical device, such as on an APU.

The processing device 125 is configured to implement a histogram manager 145 to receive data from the data source 105, and create a data set of texels 150, which is transferred to the GPU memory 137 as data set of texels 155. Additionally, histogram manager 145 creates and transfers vertex buffers 160a-160n to GPU memory 137, configures the vertex shaders 163a-163n in the vertex processor 142, configures the pixel shaders 165a-165n in the fragment processor 143, and maintains state associated with one or more buffers 167a-167n for storing to, retrieving from, and manipulating the data set of texels 155. The data set of texels 155 has a dimensionality D of at least two and each texel contains a value. The histogram manager 145 is configured to sort the data set into a point list of coordinates, wherein a point in the point list corresponds to a texel location in the data set. The histogram manager 145 is further configured to execute one or more vertex shaders 163a-163n to reduce the dimensionality of the point list by arranging points in the point list according to an N–1 dimensional dominancy. The histogram manager 145 is further configured to execute one or more pixel shaders 165a-165n to perform a raster operation on each associated value of the arranged points to obtain at least one value. The histogram manager 145 is further configured to output the at least one value to a second texture buffer (e.g., 167b) of the one or more buffers 167a-167n to produce a result. In one example, the result may be displayed on a display 170. The steps of sorting, reducing, performing, and outputting may be repeated by the processing device 125 until D is one.

In another example, the histogram manager 145 may transmit the result to one or more downstream devices 175 for use in video processing applications. In an example, the downstream device(s) 175 may implement a shot change detector for detection of shot changes in still images or video. As used herein, a machine-detectable "shot change" may be defined as a positive indication that a given "uninterrupted image sequence captured by a single camera capture" has changed to, or is changing to, another different "uninterrupted image sequence captured by a single camera." Reliable detection and signaling of shot changes within a sequence of images, e.g., a video sequence, is a difficult problem in the art. Reliable detection and signaling of shot changes has found many applications in the field of video signal processing, including cadence detection, de-interlacing, format conversion, compression encoding, and video indexing and retrieval. Shot changes are easily identified by a human viewer—such events include changeover from an episodic television program to an advertising spot or camera changes such as when a live news studio broadcast cuts from one camera angle to another on the same set.

A reliable system and method for real-time or near-real-time automatic, unattended detection of shot changes within an image sequence, with a minimum of false positives and false negatives, is taught in U.S. Pat. No. 8,451,384 (hereinafter, the '384 patent), which is incorporated herein by reference in its entirety. In the '384 patent, a hue histogram computation is performed. The computation of the hue histogram may be performed on the host CPUs 130a-130n, which may incur bottlenecks before a subsequent transfer to the GPU 140 for further processing. In another example, the hue histogram computation may be performed on the GPU 140 so as to minimize data and state transfers between the host system 120 and GPU 140 to provide enough stable throughput to enable real-time performance for large-format video such as 1080i/p and 4K.

In other examples, the downstream devices 175 may implement other still image or video features such as, but not limited to, at least one of image/object segmentation and tracking for video and images, depth from disparity estimation for video and images, text detection in video and images, no-reference video quality estimation, passive sonar target localization, sonar image recognition, robotic obstacle avoidance via vector field histograms, image classification and annotation, content-based image search and retrieval, network packet classification and inspection, or database query optimization.

Figure 2:
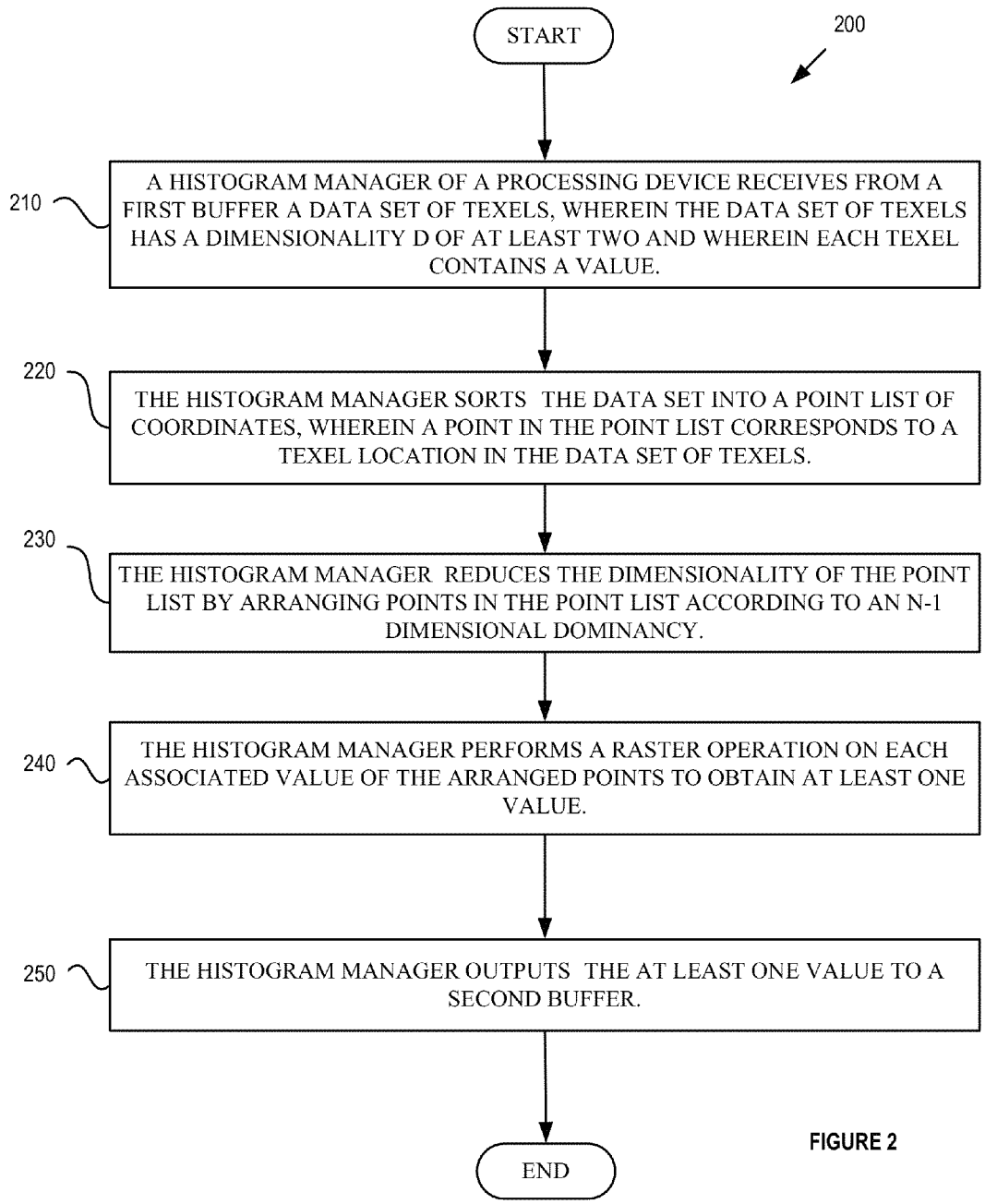
FIG. 2 is a flow diagram illustrating an example of a method for obtaining a histogram and related statistical values from a data set of texels.

FIG. 2 is a flow diagram illustrating an example of a method 200 for obtaining a histogram and related statistical values from a data set of texels. The method 200 may be performed by a computer system 100 of FIG. 1 and may comprise hardware (e.g., circuitry, dedicated logic, programmable logic, microcode, etc.), software (e.g., instructions run on a processing device), or a combination thereof. In one example, the method 200 is performed by the histogram manager 145 of the computing system 100 of FIG. 1.

As shown in FIG. 2, to permit the computing system 100 to compute a histogram and related statistical operations, at block 210, the histogram manager 145 receives from a first buffer (e.g., 167a), a data set of texels 155, wherein the data set of texels 155 has a dimensionality D of at least two and wherein each texel contains a value. At block 220, the histogram manager 145 sorts the data set into a point list of coordinates, wherein a point in the point list corresponds to a texel location in the data set of texels 155. At block 230, the histogram manager 145 reduces the dimensionality of the point list by arranging points in the point list according to an N−1 dimensional dominancy. At block 240, the histogram manager performs a raster operation on each associated value of the arranged points to obtain at least one value. At block 250, the histogram manager outputs the at least one value to a second buffer (e.g., 147b).

Figure 3:
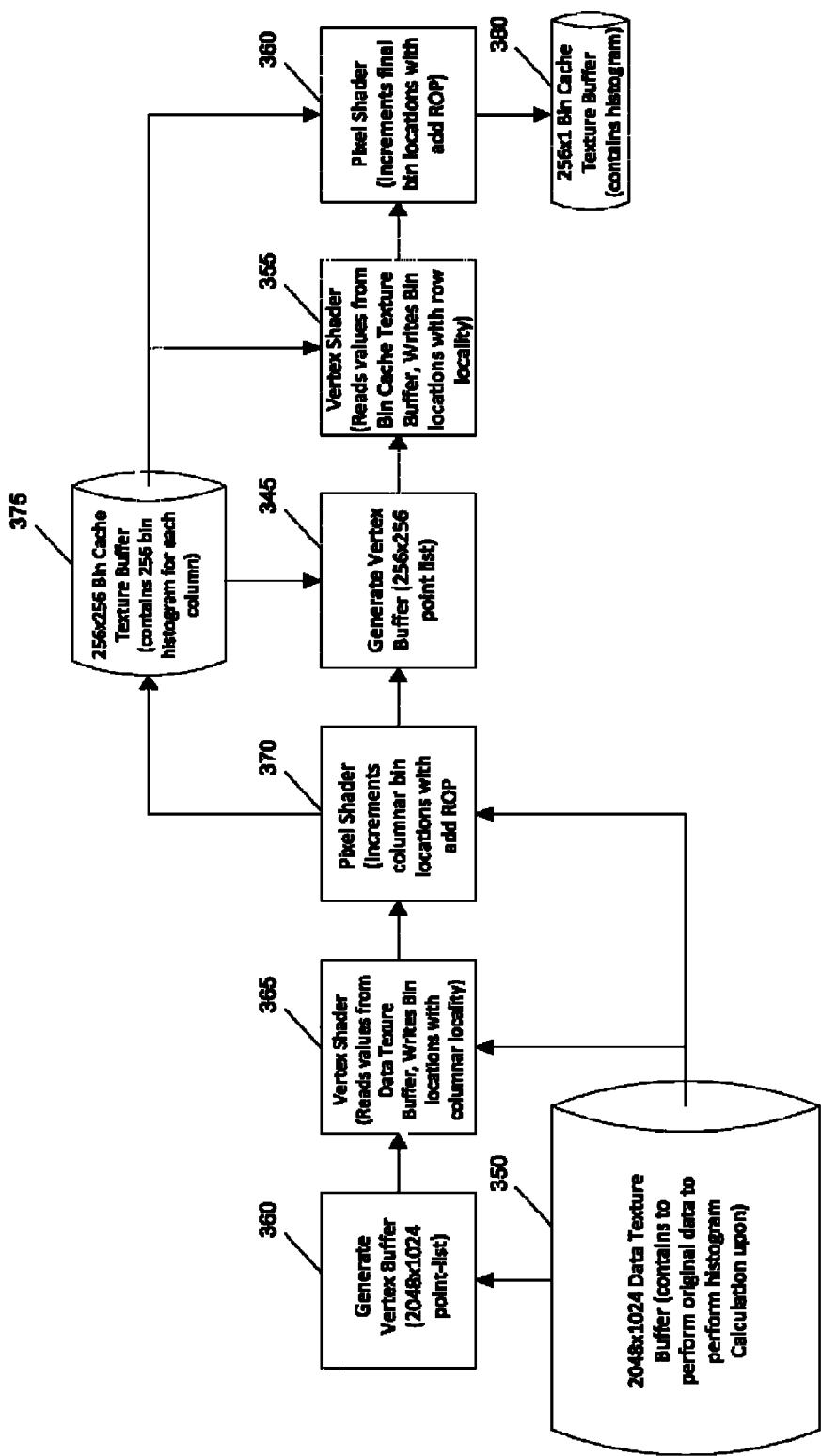
FIG. 3 is a block diagram of the example computing system of FIG. 1 adapted to compute a histogram of a data set using scatter-reduce-increment operations.

FIG. 3 is a block diagram of the example computing system 100 of FIG. 1 adapted to compute a histogram of a data set using scatter-reduce-increment operations. The elements of FIG. 3 are similar to those of FIG. 1. The histogram manager 145 is configured to receive a 2D or 3D data set from a data set texture buffer 350 of a texture memory. In an example, the data set may be uploaded by the histogram manager 145 to a data set texture buffer 350 from the host memory 135 of a host system 120, or the data set texture buffer 350 may already reside in a texture memory of the GPU 140 (not shown). The histogram manager 145 is configured to generate a first vertex buffer 360 from the data set residing in the data set texture buffer 350. The first vertex buffer 360 may comprise a point-list, which is a set of (x,y) or (x,y,z) coordinates. More particularly, this point list may be populated with a list of coordinates corresponding to individual locations of each texel within the data set of the data set texture buffer 350. It should be noted that, in an example, there is no requirement attendant upon the size nor aspect ratios of the 2D or 3D layout of allocation of the data set within the data set texture buffer 150.

The histogram manager 145 is further configured to transfer the point list from the first vertex buffer 360 to a first vertex shader 365, which also is configured to read values for each texel from the data set texture buffer 350. The histogram manager 145 is further configured to execute a first vertex shader 365 to translate to a new coordinate system the position coordinates of texels in the first vertex buffer 360 by writing to texel locations in a bin cache texture buffer 375 with columnar locality such that a vertical coordinate of a position coordinate of a texel located in bin cache texture buffer 375 is translated to a new coordinate system according to a value of an associated texel data value located in the data set texture buffer 350.

The histogram manager 145 is further configured to transfer the coordinates from the first vertex shader 365 to a first pixel shader 370. The histogram manager 145 is further configured to execute the first pixel shader 370 that to increment the texel value of a bin cache texture buffer 375 by one for every texel location of a position coordinate that the first vertex shader 365 directs the first pixel shader 370 to operate upon. For these increment operations to maintain state across parallel operations of the first pixel shader 370, the histogram manager 145 is configured to set a raster operation mode in the first pixel shader 370 to "addition".

The bin cache texture buffer 375 written to by the first pixel shader 370 may be configured not to have the bin width and one row, but to have the width and height of the requested bin size of the histogram. By employing a large N×N intermediate texture, simultaneous write operations through the bin cache texture buffer 375 are reduced by as much as a factor of data set size/bin size for extreme cases with large modalities. The worst-case for such a data set, for example, is one with all identical values, such as zero. In such circumstances, if the destination texture were of size N×1, a data set-sized number of write requests would all stack up behind each other for the identical texel location, namely bin location (0, 0) in the destination texture, drastically increasing the cache defeat rate and most likely causing a pipeline stall.

After the operations performed by the first pixel shader 370, the bin cache texture buffer 375 substantially comprises a histogram for each column. To obtain a final histogram in a destination bin cache texture buffer 380, the histogram manager 145 creates a second vertex buffer 345, again as a point list, where each coordinate corresponds to the texel locations of the bin cache texture buffer 375. A second vertex shader 355 and a second pixel shader 360, substantially identical to the first vertex shader 365 and the first pixel shader 330, respectively, perform, respectively, the same scatter-reduce-increment operations, this time to the destination bin cache texture buffer 380 with a height of one and a width equal to the bin size. It will be appreciated by one skilled in the art that the first scatter-reduce-increment operations may be performed in a row-dominant format, rather than a column-dominant fashion, and the second scatter-reduce-increment operations may be performed in a column-dominant format, rather than a row-dominant fashion.

Figure 4A:
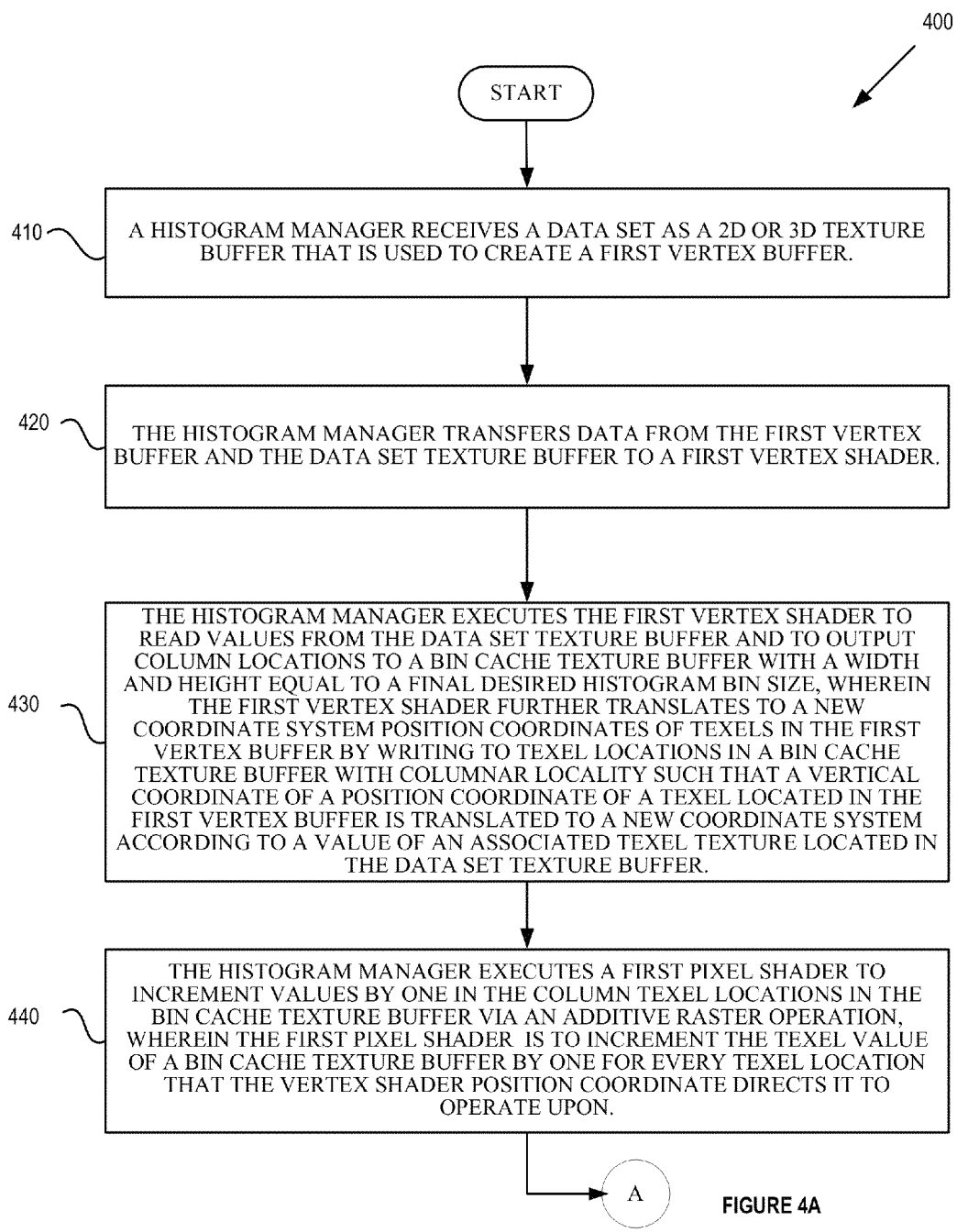
FIG. 4A-4B is a flow diagram illustrating an example of a method for computing a histogram using scatter-reduce-increment operations.
Figure 4B:
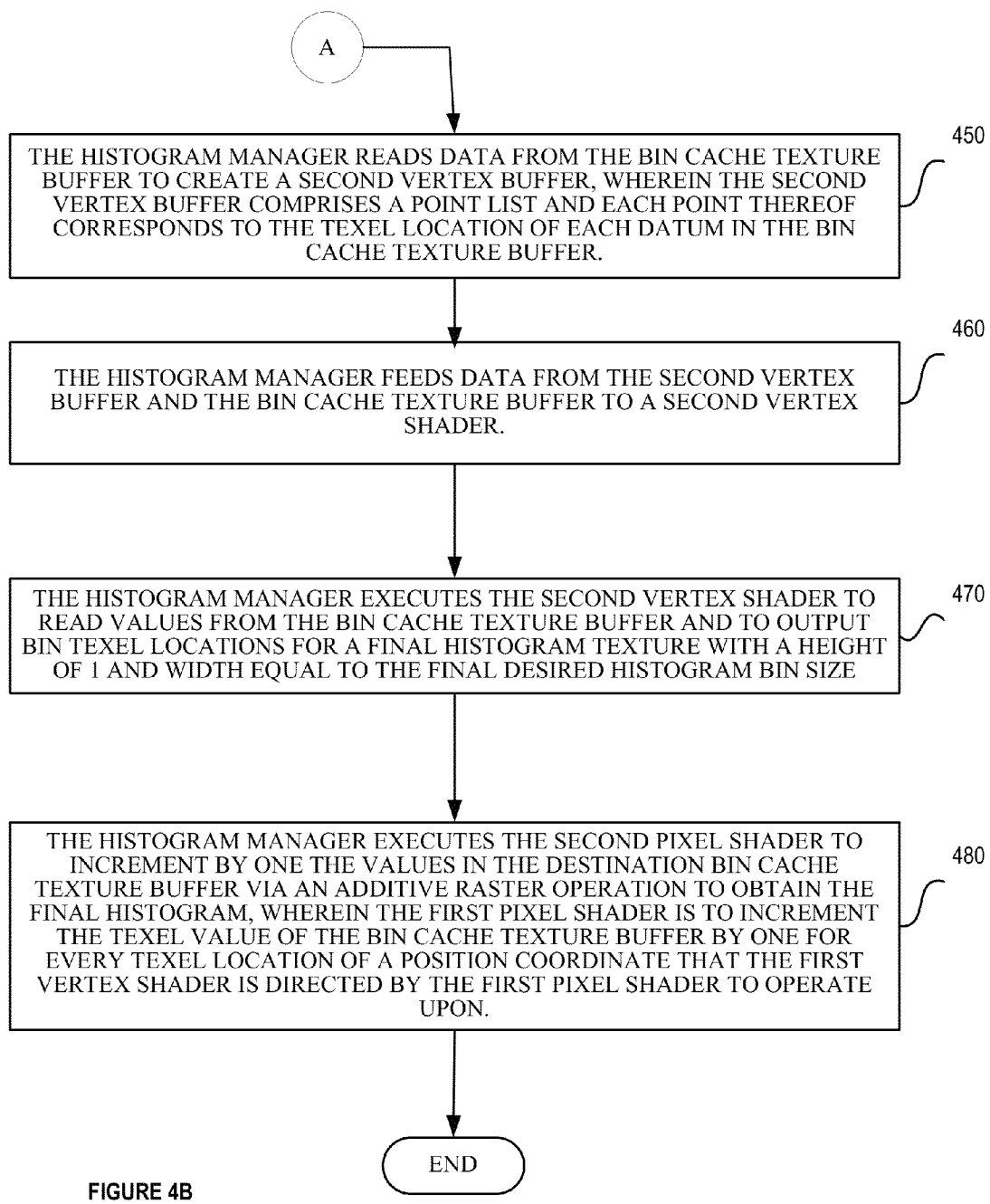

FIG. 4A-4B is a flow diagram illustrating an example of a method 400 for computing a histogram using scatter-reduce-increment operations. The method 400 may be performed by a computer system 100 of FIG. 1 and may comprise hardware (e.g., circuitry, dedicated logic, programmable logic, microcode, etc.), software (e.g., instructions run on a processing device), or a combination thereof. In one example, the method 400 is performed by the histogram manager 145 of the computing system 100 of FIG. 1.

As shown in FIG. 4A-4B, to permit the computing system 100 to compute a histogram, at block 410, the histogram manager 145 receives a data set extant on a GPU as a 2D or 3D texture buffer or a 2D or 3D texture buffer uploaded from the host system 120 to the GPU 140 that is used to create first vertex buffer 360. The first vertex buffer 360 comprises a point list and each point thereof corresponds to the texel location of each datum in the data set. At block 420, the histogram manager 145 transfers data from the first vertex buffer 360 and the data set texture buffer 350 to the first vertex shader 365. At block 430, the histogram manager 145 executes the first vertex shader 365 to read values from the data set texture buffer 350 and to output column locations to the bin cache texture buffer 375 with a width and height equal to a final desired histogram bin size. The first vertex shader 365 further translates to a new coordinate system position coordinates of texels in the first vertex buffer 360 by writing to texel locations in bin cache texture buffer 375 with columnar locality such that a vertical coordinate of a position coordinate of a texel located in the first vertex buffer 360 is translated to a new coordinate system according to a value of an associated texel texture located in the data set texture buffer 350. At block 440, the histogram manager 145 executes the first pixel shader 370 to increment values by one in the column texel locations in the bin cache texture buffer 375 via an additive raster operation. The first pixel shader 370 is to increment the texel value of a bin cache texture buffer 375 by one for every texel location that the vertex shader position coordinate directs it to operate upon.

At block 450, the histogram manager 145 reads data from the bin cache texture buffer 375 to create the second vertex buffer 345, wherein the second vertex buffer 345 comprises a point list and each point thereof corresponds to the texel location of each datum in the bin cache texture buffer 375. At block 460, the histogram manager 145 feeds data from the second vertex buffer 345 and the bin cache texture buffer 375 to the second vertex shader 355. At block 470, the histogram manager 145 executes the second vertex shader 355 to read values from the bin cache texture buffer 375 and to output bin texel locations for a final histogram texture with a height of 1 and width equal to the final desired histogram bin size. At block 480, the histogram manager 145 executes the second pixel shader 360 to increment by one the values in the destination bin cache texture buffer 380 via an additive raster operation to obtain the final histogram. The first pixel shader 370 is to increment the texel value of the bin cache texture buffer 375 by one for every texel location of a position coordinate that the first vertex shader 365 is directed by the first pixel shader 370 to operate upon.

Figure 5:
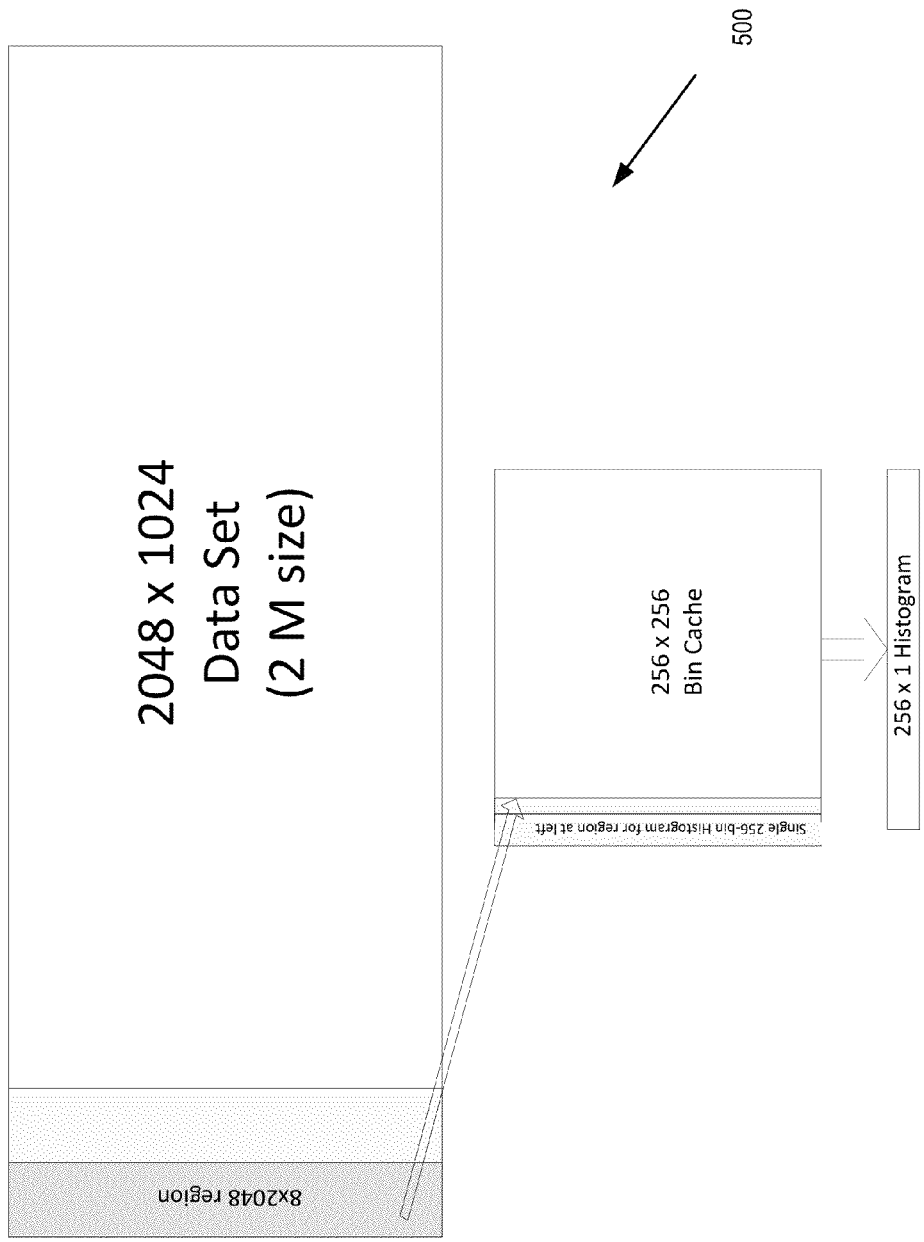
FIG. 5 depicts the spatial layout of the progression of data through an embodiment of the present invention via scatter-reduction process with columnar-dominant bias.

FIG. 5 illustrates a spatial layout 500 of the progression of data from a 2D data set texture 350 through the two steps of scatter-reduce-increment operations. The 2D data set texture buffer 350 is reduced from, e.g., a 2048×1024 data set to an intermediate 256×256 data set in the bin cache texture buffer 375 to a final 256×1 histogram in the destination bin cache texture buffer 380. FIG. 5 illustrates a columnar-dominant form of an embodiment. It will be appreciated that, in another embodiment, the first vertex shader 365 may be configured to translate to a new coordinate system the position coordinates of texels in the first vertex buffer 360 by writing to texel locations in the first vertex buffer 360 with row locality instead of column locality. It will also be appreciated that for a 3D texture, the order of operations is similar, with the exception that first operations may be performed in a xy planar-dominant way (where again the choice of the xy, zy, or xz planar-dominancy is arbitrary), that second operations may be performed in either row- or column-dominant way, and third operations result in a final histogram of a data set.

Figure 6:
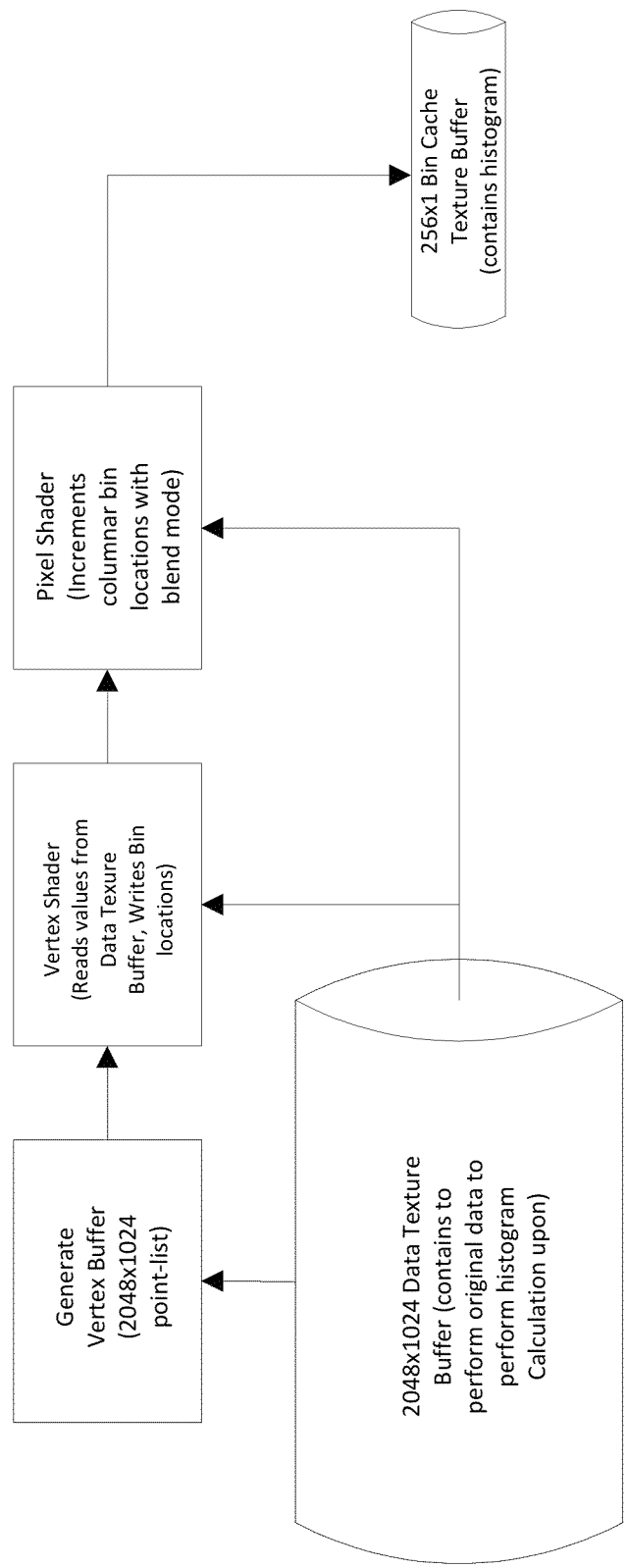
FIG. 6 depicts a process and data flow diagram illustrating a first example prior art steps for computing a histogram of a data set on a GPU.

FIG. 6 is a block diagram of a process and data flow corresponding to an example of a histogram calculation as performed in Scheuermann and Hensley. In Scheuermann and Hensley, there is a single scatter-reduction-increment operation. As noted above, there is considerable variability in performance than is alleviated by increasing the bin size. By way of distinction, a more efficient and optimized way to alleviate the cache-write collision problem as described in embodiments is to increase the dimensionality of the first bin, and continue to reduce the dimensionality until D=1. This confers a GPU with the advantages of optimization of memory cache efficiency without a penalty in run time. Further, certain embodiments of the present disclosure confer a GPU with a consistent and predictable non-data-dependent performance and run-time, which is crucial for systems that must operate in real-time or under severe throughput constraints.

Figure 7A:
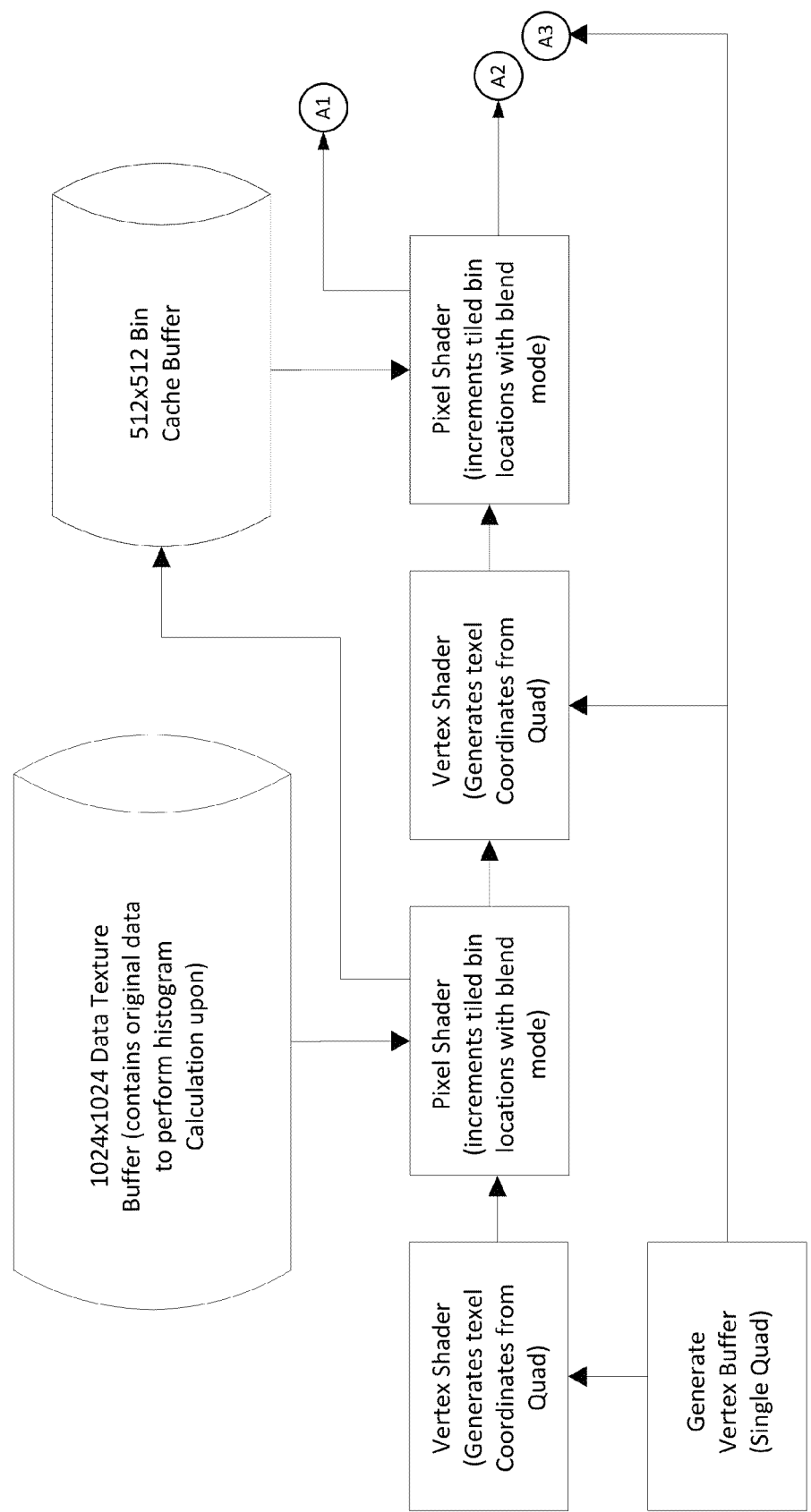
FIG. 7A-7C is a block diagram of a process and data flow corresponding to an example of a histogram calculation as performed in U.S. Pat. No. 7,889,922 (hereinafter the '922 patent).
Figure 7B:
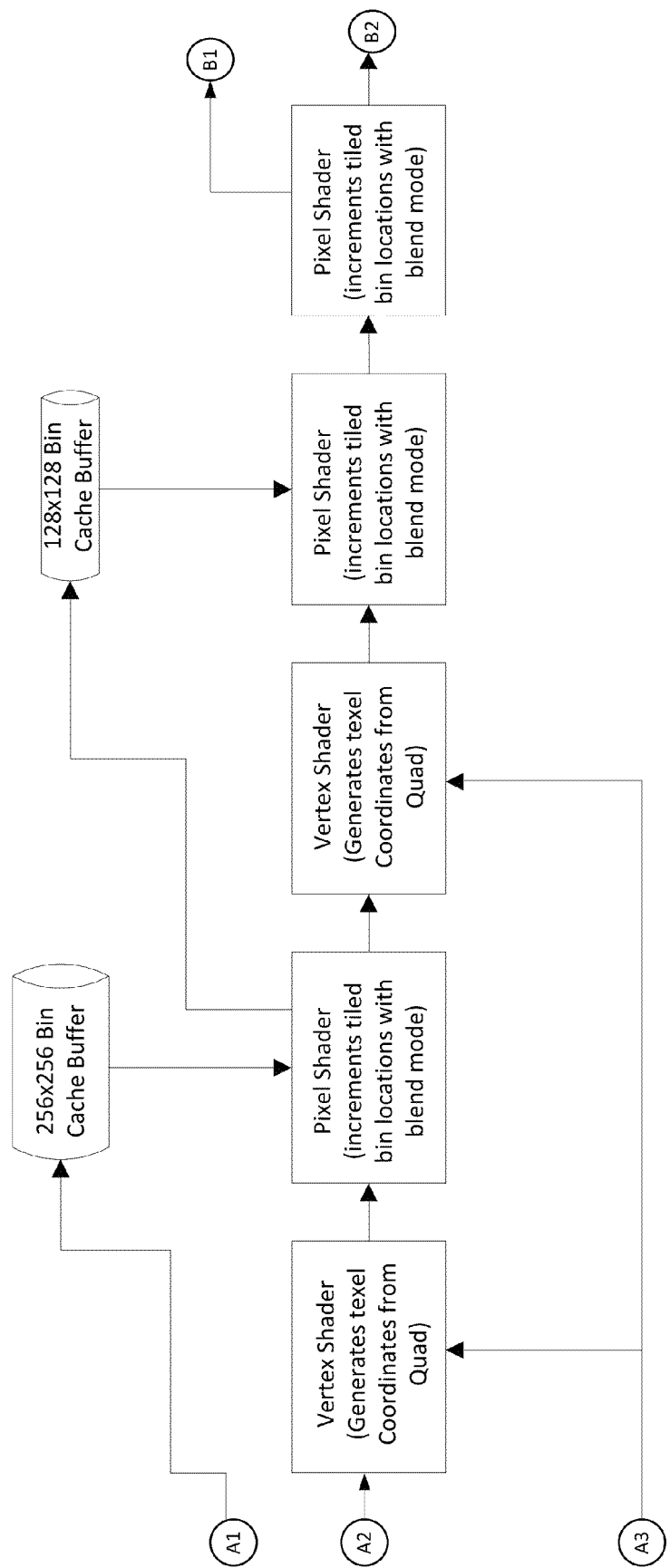
Figure 7C:
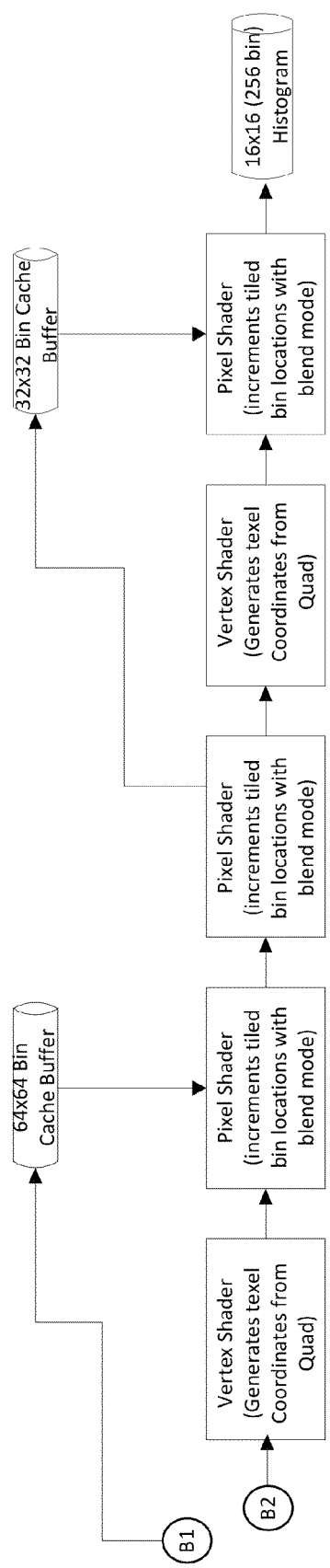

FIG. 7A-7C is a block diagram of a process and data flow corresponding to an example of a histogram calculation as performed in U.S. Pat. No. 7,889,922 (hereinafter the '922 patent). While capable of running on even earlier GPU hardware by relying on vertex shaders without an ability to read texture memory, the example taught in the '922 patent forces an iterative reduction technique that is unbounded. By way of comparison, in certain embodiments of the present disclosure, for a D-dimensional data set texture buffer, at most D scatter-reduce-increment steps are required—as a practical matter D=2 for all but the largest data sets; whereas based on the example illustrated in FIG. 7A-7C, the number of reduction steps required is given by Equation 1 if the data set size is a power of 2.

$$\log_2(\sqrt{\text{datasetsize}}) \quad (1)$$

It will be noted that as the size of the data set increases for the example of FIG. 7A-7C, so does the initial tile size, and also the number of reduction operations. As a result, performance for the example of FIG. 7A-7C is suboptimal especially for large data sets.

Figure 8:
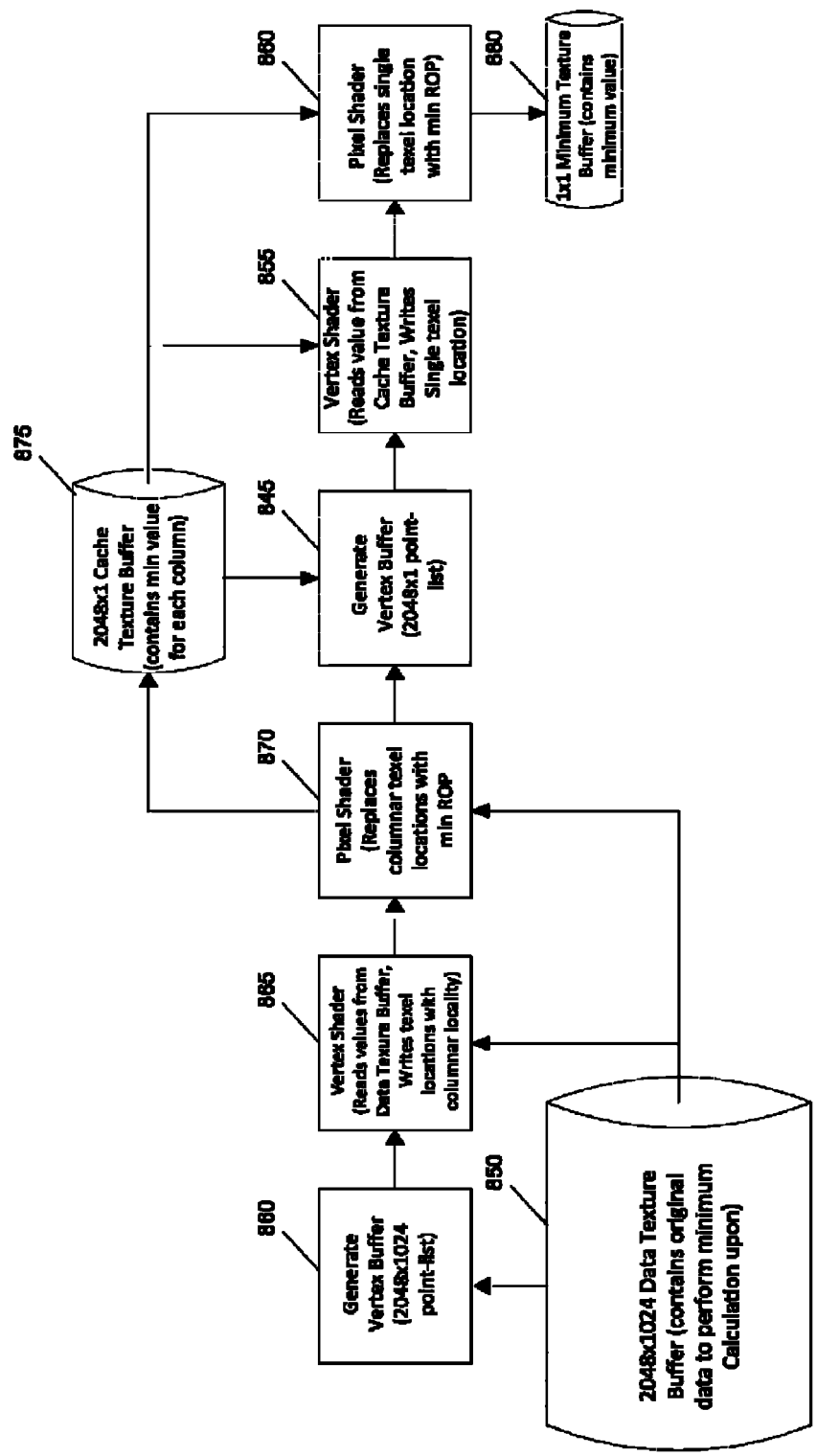
FIG. 8 is a block diagram of the example computing system of FIG. 1 adapted to compute a minimum value of a data set using scatter-reduce-replace operations.

FIG. 8 is a block diagram of the example computing system 100 of FIG. 1 adapted to compute a minimum value of a data set using scatter-reduce-replace operations. The elements of FIG. 8 are similar to those of FIG. 1, except that a first pixel shader 870 and a second pixel shader 860 are adapted to place the value in a corresponding bin cache texture buffer 875 and a destination bin cache texture buffer 880, respectively, instead of incrementing by 1 as in the histogram computation and to employ a "minimum" raster operation instead of an "additive" raster operation. A bin cache texture buffer 875 is no longer a width and height of bin size, but rather the width of the original data set, and height of 1. Additionally, a destination bin cache texture buffer 880 is adapted to contain a single minimum value with a width and height equal to 1.

Figure 9A:
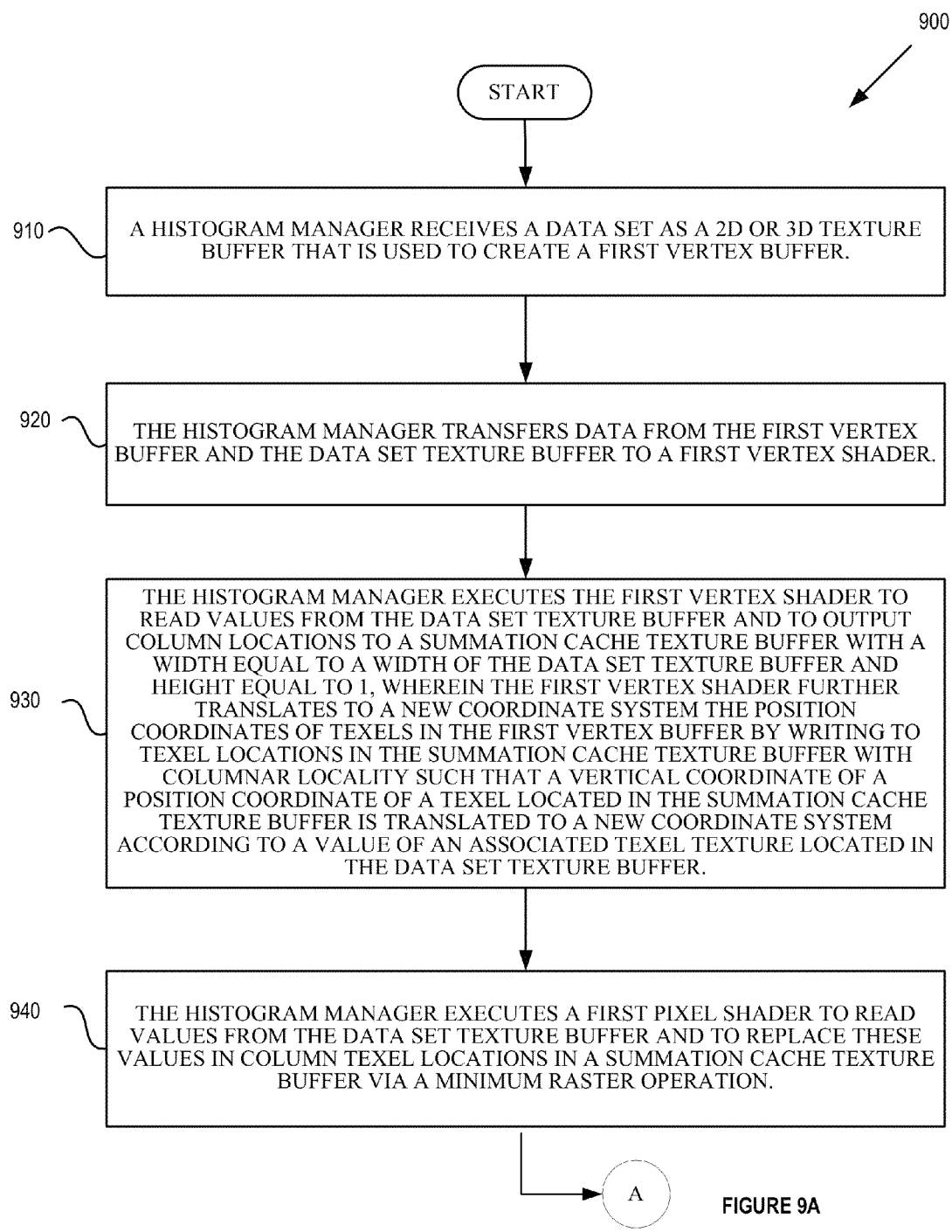
FIG. 9A-9B is a flow diagram illustrating an example of a method for computing a minimum value of a data set using scatter-reduce-replace operations.
Figure 9B:
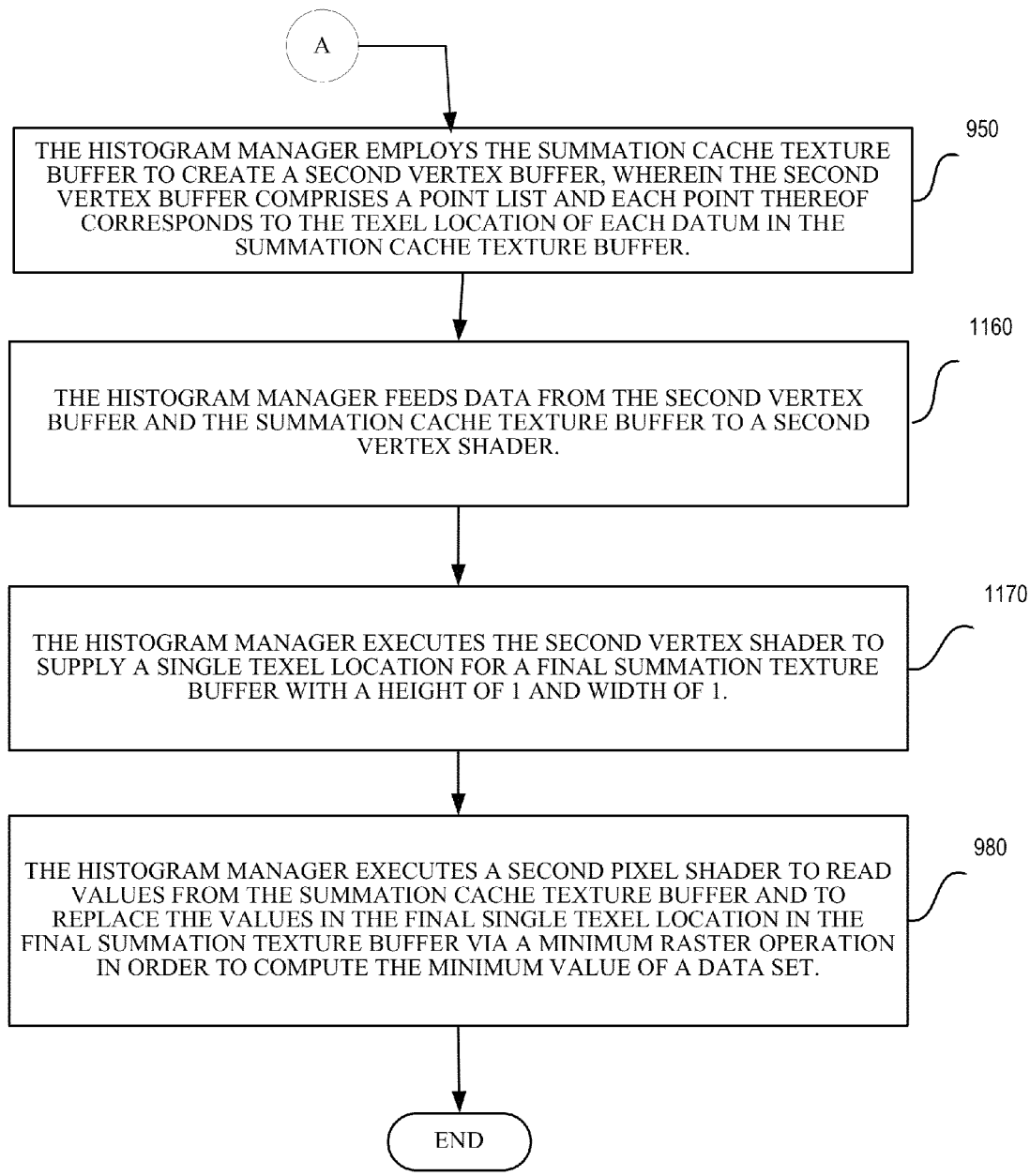

FIG. 9A-9B is a flow diagram illustrating an example of a method 900 for computing a minimum value of a data set using scatter-reduce-replace operations. The method 900 may be performed by a computer system 100 of FIG. 1 and may comprise hardware (e.g., circuitry, dedicated logic, programmable logic, microcode, etc.), software (e.g., instructions run on a processing device), or a combination thereof. In one example, the method 900 is performed by the histogram manager 145 of the computing system 100 of FIG. 1.

As shown in FIG. 9A-9B, to permit the computing system 100 to compute a minimum value of a data set, at block 910, the histogram manager 145 receives a data set extant on the GPU 140 as a 2D or 3D texture buffer or a 2D or 3D texture buffer uploaded from the host system 120 to the GPU 140 that is used to create first vertex buffer 860. A first vertex buffer 860 comprises a point list and each point thereof corresponds to the texel location of each datum in the data set. At block 920, the histogram manager 145 transfers data from the first vertex buffer 860 and a data set texture buffer 850 to a first vertex shader 865. At block 930, the histogram manager 145 executes the first vertex shader 865 to read values from the data set texture buffer 850 and to output column locations to a summation cache texture buffer 885 with a width equal to a width of the data set texture buffer 850 and height equal to 1. The first vertex shader 865 further translates to a new coordinate system the position coordinates of texels in the first vertex buffer 860 by writing to texel locations in the summation cache texture buffer 885 with columnar locality such that a vertical coordinate of a position coordinate of a texel located in the summation cache texture buffer 885 is translated to a new coordinate system according to a value of an associated texel texture located in the data set texture buffer 850. At block 940, the histogram manager 145 executes the first pixel shader 870 to read values from the data set texture buffer 850 and to replace these values in column texel locations in the summation cache texture buffer 885 via a minimum raster operation.

At block 950, the histogram manager 145 employs the summation cache texture buffer 885 to create a second vertex buffer 845, wherein the second vertex buffer 845 comprises a point list and each point thereof corresponds to the texel location of each datum in the summation cache texture buffer 885. At block 960, the histogram manager 145 feeds data from the second vertex buffer 845 and the summation cache texture buffer 885 to a second vertex shader 855. At block 970, the histogram manager 145 executes the second vertex shader 855 to supply a single texel location for a final summation texture buffer 890 with a height of 1 and width of 1. At block 980, the histogram manager 145 executes a second pixel shader 860 to read values from the summation cache texture buffer 885 and to replace the values in the final single texel location in the final summation texture buffer 890 via a minimum raster operation in order to compute the minimum value of a data set.

Figure 10:
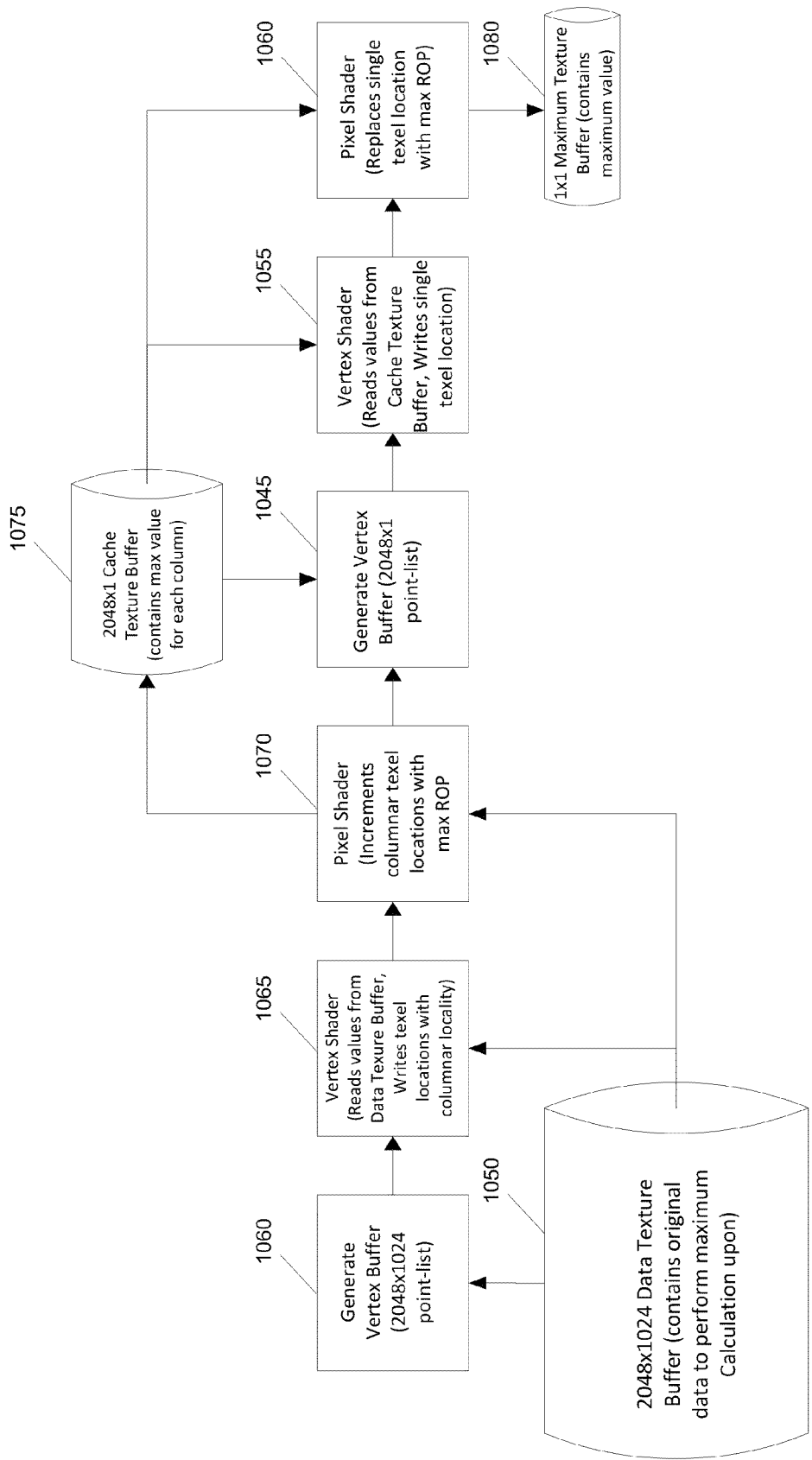
FIG. 10 is a block diagram of the example computing system of FIG. 1 adapted to compute a maximum value of a data set using scatter-reduce-replace operations.

FIG. 10 is a block diagram of the example computing system 100 of FIG. 1 adapted to compute a maximum value of a data set using scatter-reduce-replace operations. The elements of FIG. 10 are similar to those of FIG. 1, except that a first pixel shader 1070 and a second pixel shader 1060 are adapted to place the value in a corresponding bin cache texture buffer 1075 and a destination bin cache texture buffer 1080, respectively, instead of incrementing by 1 as in the histogram computation and to employ a "maximum" raster operation instead of an "additive" raster operation. A bin cache texture buffer 1075 is no longer a width and height of bin size, but rather the width of the original data set, and height of 1. Additionally, the destination bin cache texture buffer 1080 is adapted to contain a single minimum value with a width and height equal to 1.

Figure 11A:
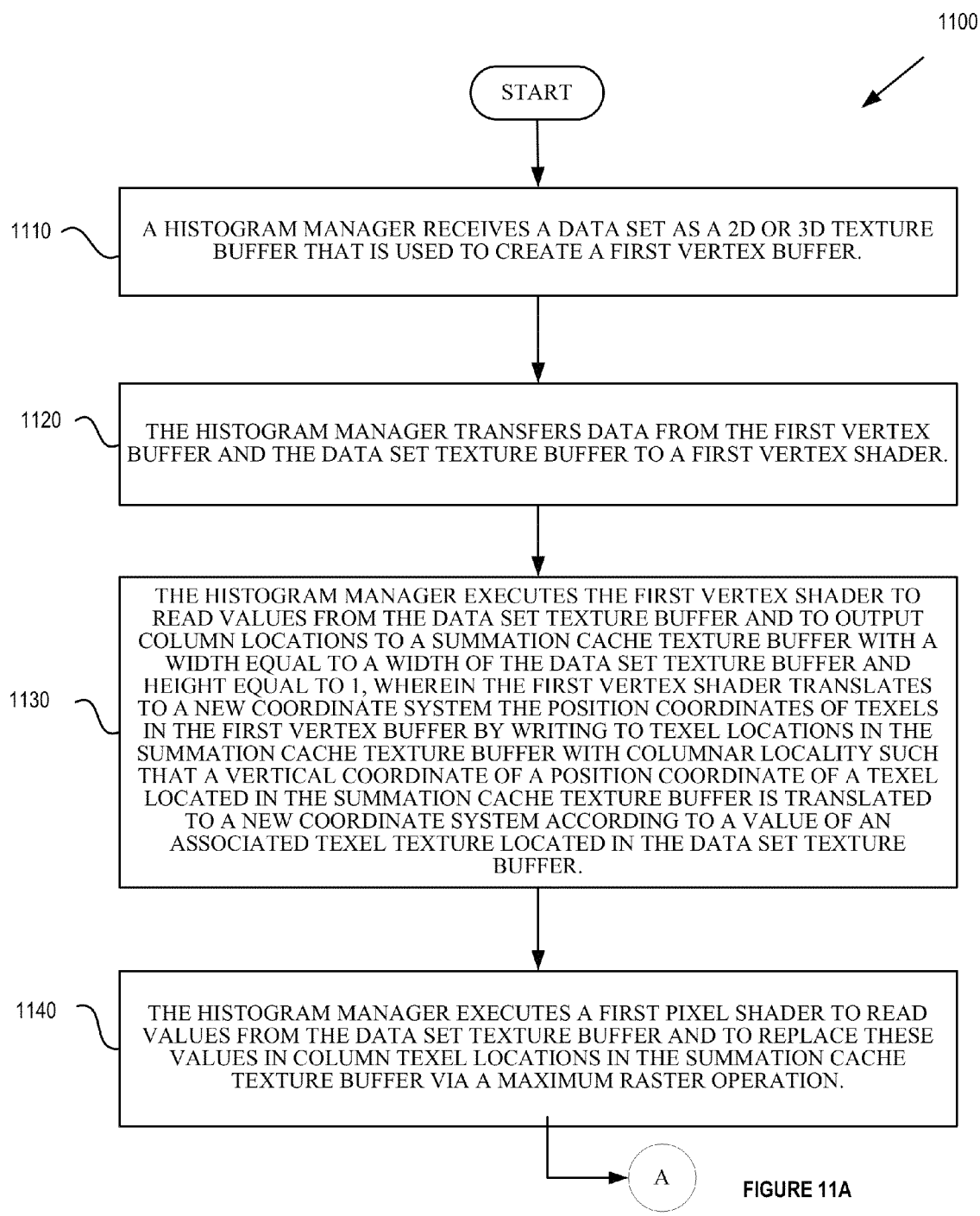
FIG. 11A-11B is a flow diagram illustrating an example of a method for computing a maximum value of a data set using scatter-reduce-add operations.
Figure 11B:
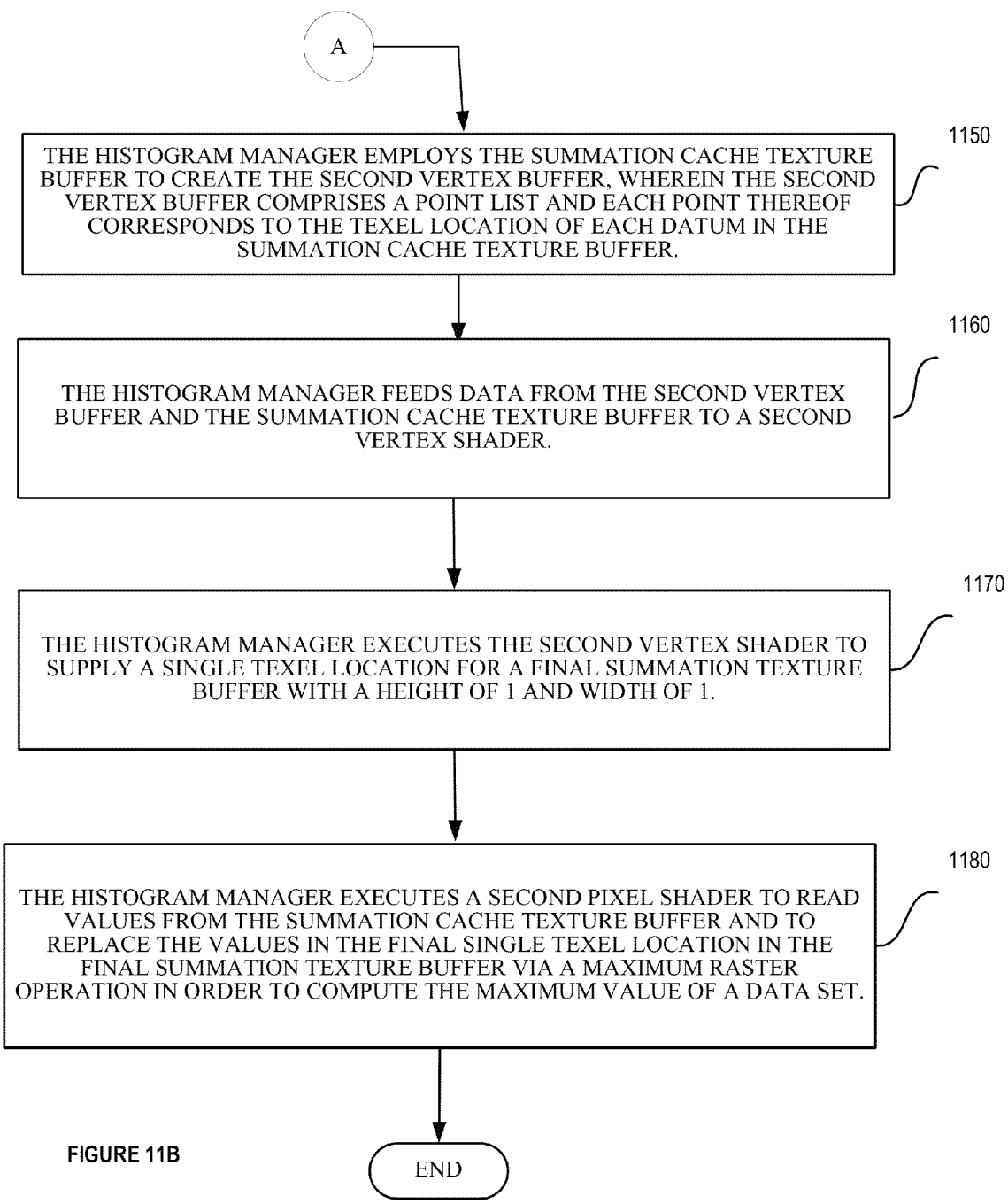

FIG. 11A-11B is a flow diagram illustrating an example of a method 1100 for computing a maximum value of a data set using scatter-reduce-replace operations. The method 1100 may be performed by a computer system 100 of FIG. 1 and may comprise hardware (e.g., circuitry, dedicated logic, programmable logic, microcode, etc.), software (e.g., instructions run on a processing device), or a combination thereof. In one example, the method 1100 is performed by the histogram manager 145 of the computing system 100 of FIG. 1.

As shown in FIG. 11A-11B, to permit the computing system 100 to compute a maximum value of a data set, at block 1110, the histogram manager 145 receives a data set extant on the GPU 140 as a 2D or 3D texture buffer or a 2D or 3D texture buffer uploaded from the host system 120 to the GPU 140 that is used to create first vertex buffer 1060. A first vertex buffer 1060 comprises a point list and each point thereof corresponds to the texel location of each datum in the data set. At block 1120, the histogram manager 145 transfers data from the first vertex buffer 1060 and a data set texture buffer 1050 to a first vertex shader 1065. At block 1130, the histogram manager 145 executes the first vertex shader 1065 to read values from the data set texture buffer 1050 and to output column locations to a summation cache texture buffer 1085 with a width equal to a width of the data set texture buffer 1050 and height equal to 1. The first vertex shader 1065 further translates to a new coordinate system the position coordinates of texels in the first vertex buffer 1060 by writing to texel locations in a summation cache texture buffer 1085 with columnar locality such that a vertical coordinate of a position coordinate of a texel located in the summation cache texture buffer 1085 is translated to a new coordinate system according to a value of an associated texel texture located in the data set texture buffer 1050. At block 1140, the histogram manager 145 executes a first pixel shader 1070 to read values from the data set texture buffer 1050 and to replace these values in column texel locations in the summation cache texture buffer 1085 via a maximum raster operation.

At block 1150, the histogram manager 145 employs the summation cache texture buffer 1085 to create a second vertex buffer 1045, wherein the second vertex buffer comprises 1045 a point list and each point thereof corresponds to the texel location of each datum in the summation cache texture buffer 1085. At block 1160, the histogram manager 145 feeds data from the second vertex buffer 1045 and the summation cache texture buffer 1085 to a second vertex shader 1055. At block 1170, the histogram manager 145 executes second vertex shader 1055 to supply a single texel location for a final summation texture buffer 1090 with a height of 1 and width of 1. At block 1180, the histogram manager 145 executes a second pixel shader 1060 to read values from the summation cache texture buffer 1085 and replaces the values in the final single texel location in the final summation texture buffer 1090 via a maximum raster operation in order to compute the maximum value of a data set.

Figure 12:
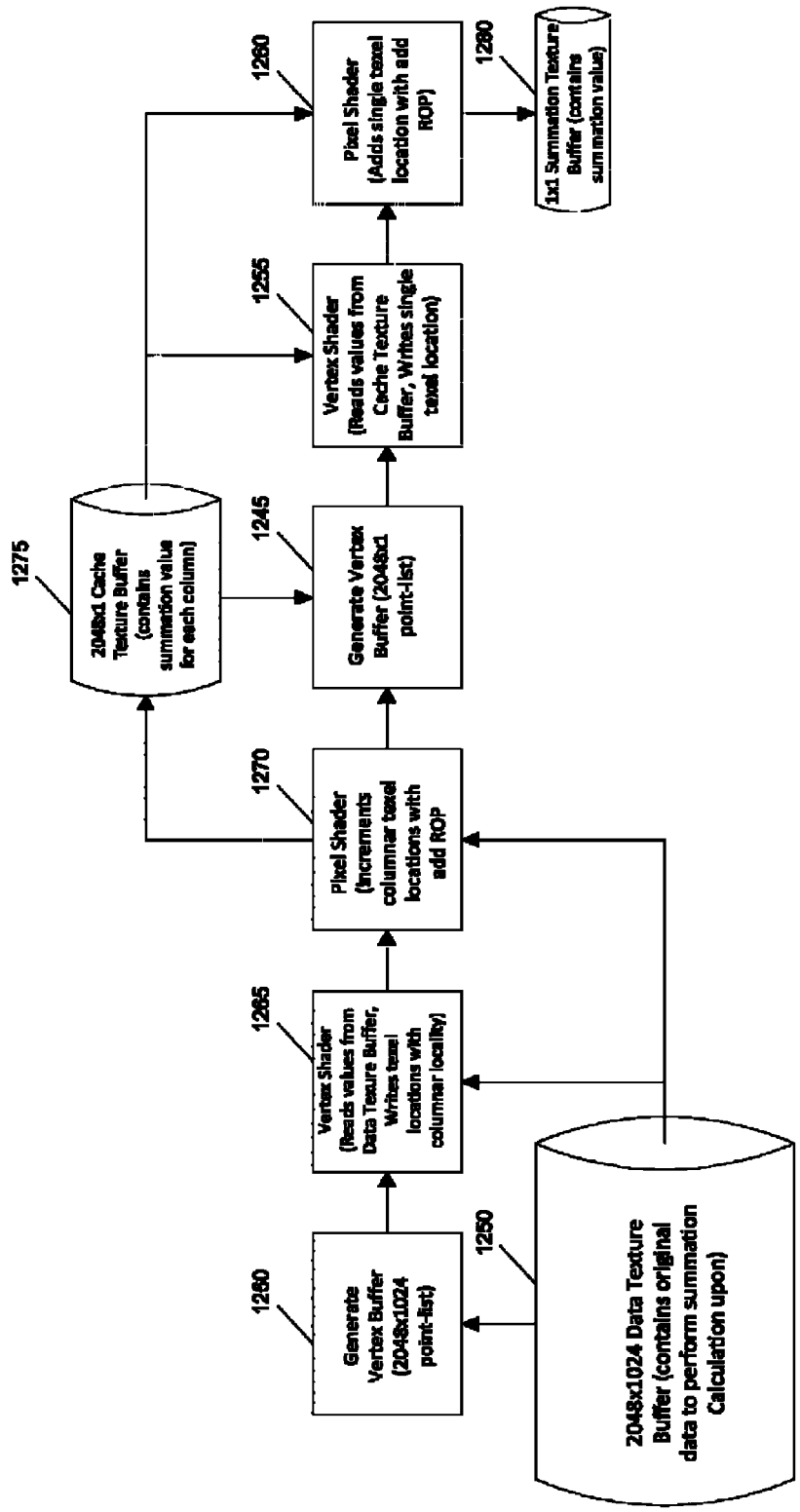
FIG. 12 is a block diagram of the example computing system of FIG. 1 adapted to compute a summation value of a data set using scatter-reduce-add operations.

FIG. 12 is a block diagram of the example computing system 100 of FIG. 1 adapted to compute a summation value of a data set using scatter-reduce-add operations. The elements of FIG. 12 are similar to those of FIG. 1, except that a first pixel shader 1270 and a second pixel shader 1260 are adapted to add a value (e.g., perform an "additive" raster operation) instead of incrementing by 1 as in the histogram computations of FIGS. 1 and 2. A bin cache texture buffer 1275 is no longer a width and height of bin size, but rather the width of the original data set, and height of 1. Additionally, a destination bin cache texture buffer 1280 is adapted to contain a single summation value with a width and height equal to 1.

Figure 13A:
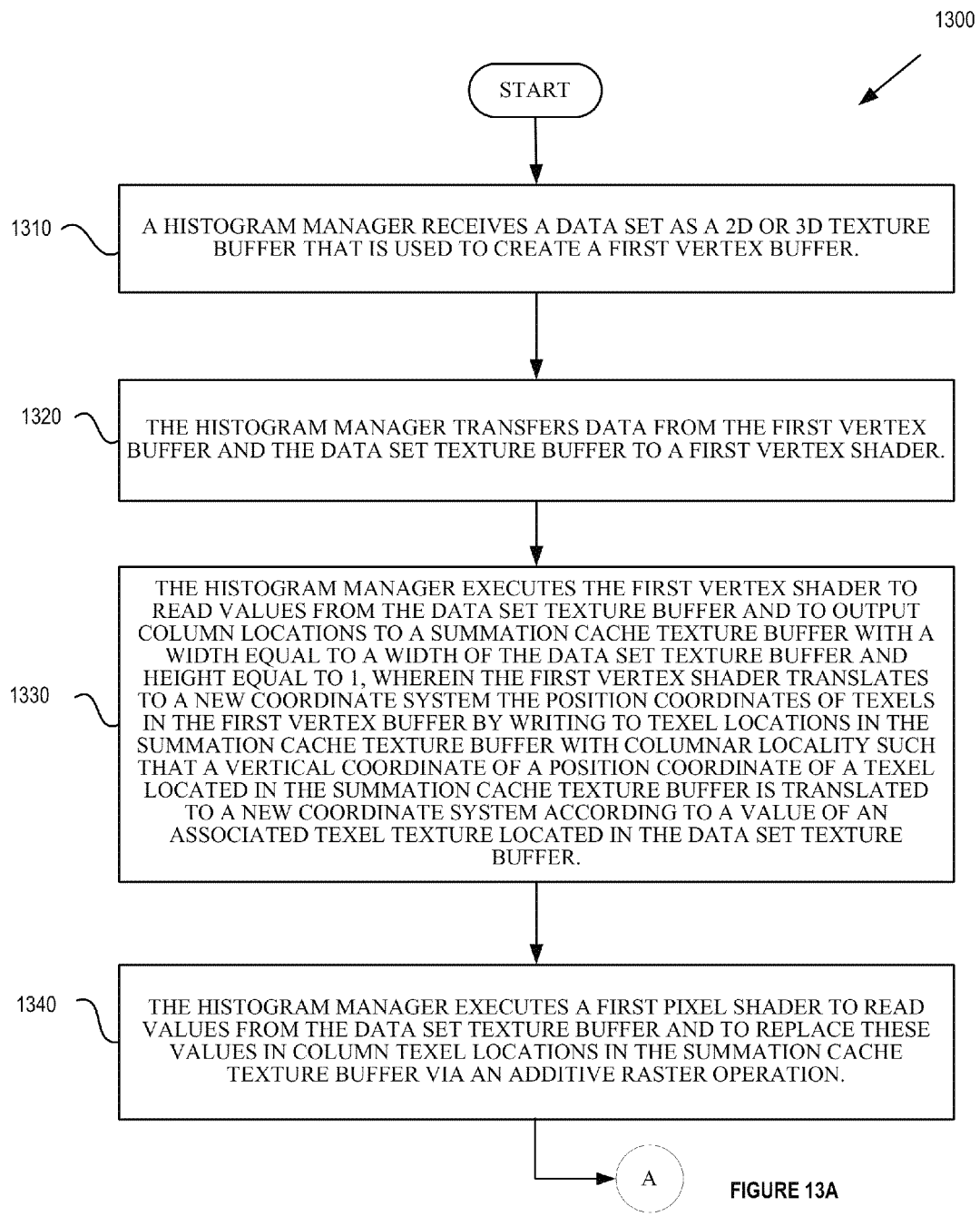
FIG. 13A-13B is a flow diagram illustrating an example of a method for computing a summation value of a data set using scatter-reduce-add operations.
Figure 13B:
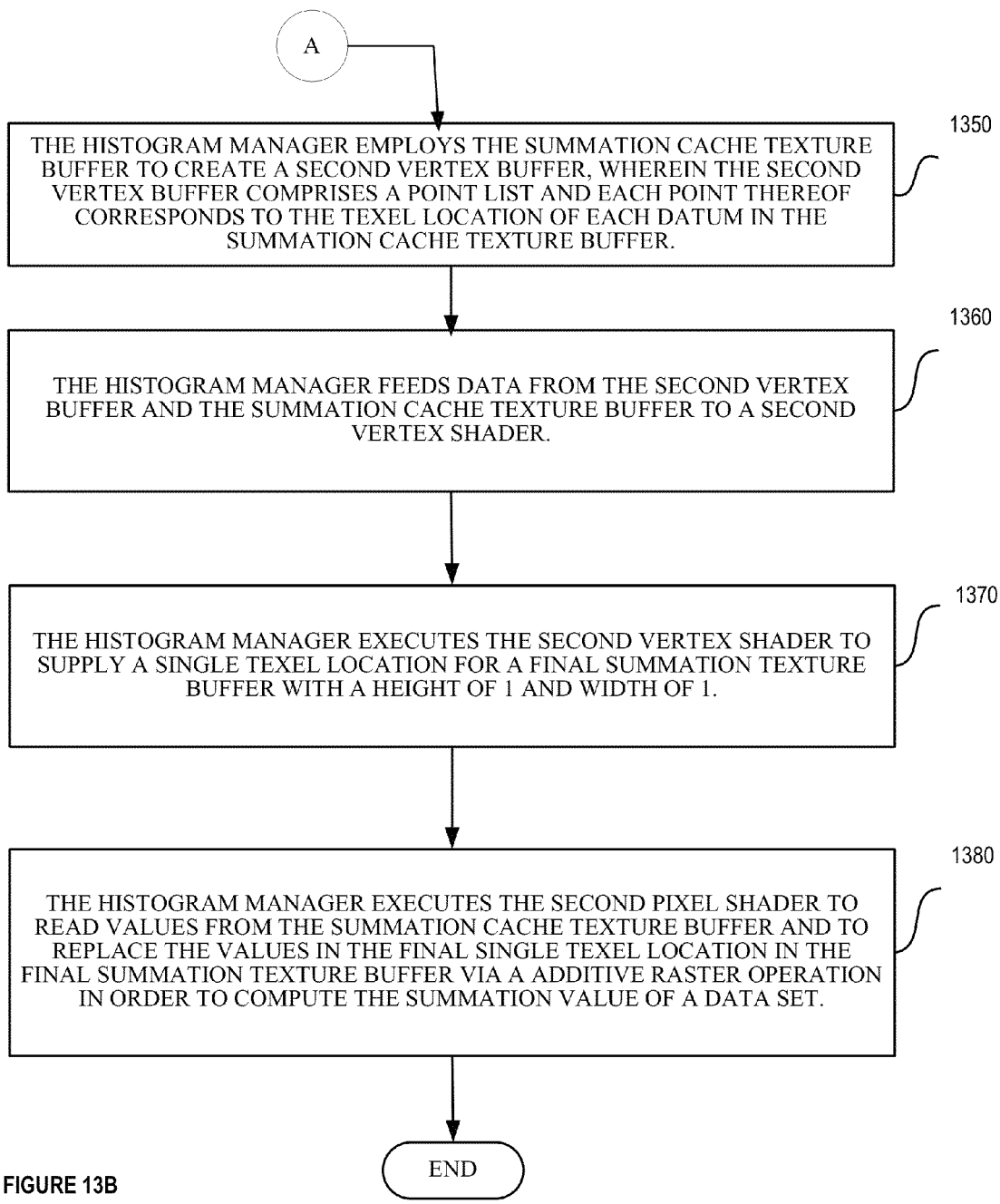

FIG. 13A-13B is a flow diagram illustrating an example of a method 1300 for computing a summation value of a data set using scatter-reduce-add operations. The method 1300 may be performed by a computer system 100 of FIG. 1 and may comprise hardware (e.g., circuitry, dedicated logic, programmable logic, microcode, etc.), software (e.g., instructions run on a processing device), or a combination thereof. In one example, the method 1300 is performed by the histogram manager 145 of the computing system 100 of FIG. 1.

As shown in FIG. 13A-13B, to permit the computing system 100 to compute a summation value of a data set, at block 1310, the histogram manager 145 receives a data set extant on the GPU 140 as a 2D or 3D texture buffer or a 2D or 3D texture buffer uploaded from the host system 120 to the GPU 140 that is used to create first vertex buffer 1260. The first vertex buffer 1260 comprises a point list and each point thereof corresponds to the texel location of each datum in the data set. At block 1320, the histogram manager 145 transfers data from the first vertex buffer 1260 and a data set texture buffer 1250 to a first vertex shader 1265. At block 1330, the histogram manager 145 executes the first vertex shader 1265 to read values from the data set texture buffer 1250 and to output column locations to a summation cache texture buffer 1285 with a width equal to a width of the data set texture buffer 1250 and height equal to 1. The first vertex shader 1265 further translates to a new coordinate system the position coordinates of texels in the first vertex buffer 1260 by writing to texel locations in the summation cache texture buffer 1285 with columnar locality such that a vertical coordinate of a position coordinate of a texel located in the summation cache texture buffer 1285 is translated to a new coordinate system according to a value of an associated texel texture located in the data set texture buffer 1250. At block 1340, the histogram manager 145 executes a first pixel shader 1270 to reads value from the data set texture buffer 1250 and to add these values in column texel locations in the summation cache texture buffer 1285 via an additive raster operation.

At block 1350, the histogram manager 145 employs the summation cache texture buffer 1285 to create a second vertex buffer 1245, wherein the second vertex buffer 1285 comprises a point list and each point thereof corresponds to the texel location of each datum in the summation cache texture buffer 1285. At block 1360, the histogram manager 145 feeds data from the second vertex buffer 1245 and the summation cache texture buffer 1285 to a second vertex shader 1255. At block 1370, the histogram manager 145 executes the second vertex shader 1255 to supply a single texel location for a final summation texture buffer 1290 with a height of 1 and width of 1. At block 1380, the histogram manager 145 executes a second pixel shader 1260 to read values from the summation cache texture buffer 1285 and to add the values in the final single texel location in the final summation texture buffer 1290 via an additive raster operation in order to compute the summation value of a data set.

Figure 14:
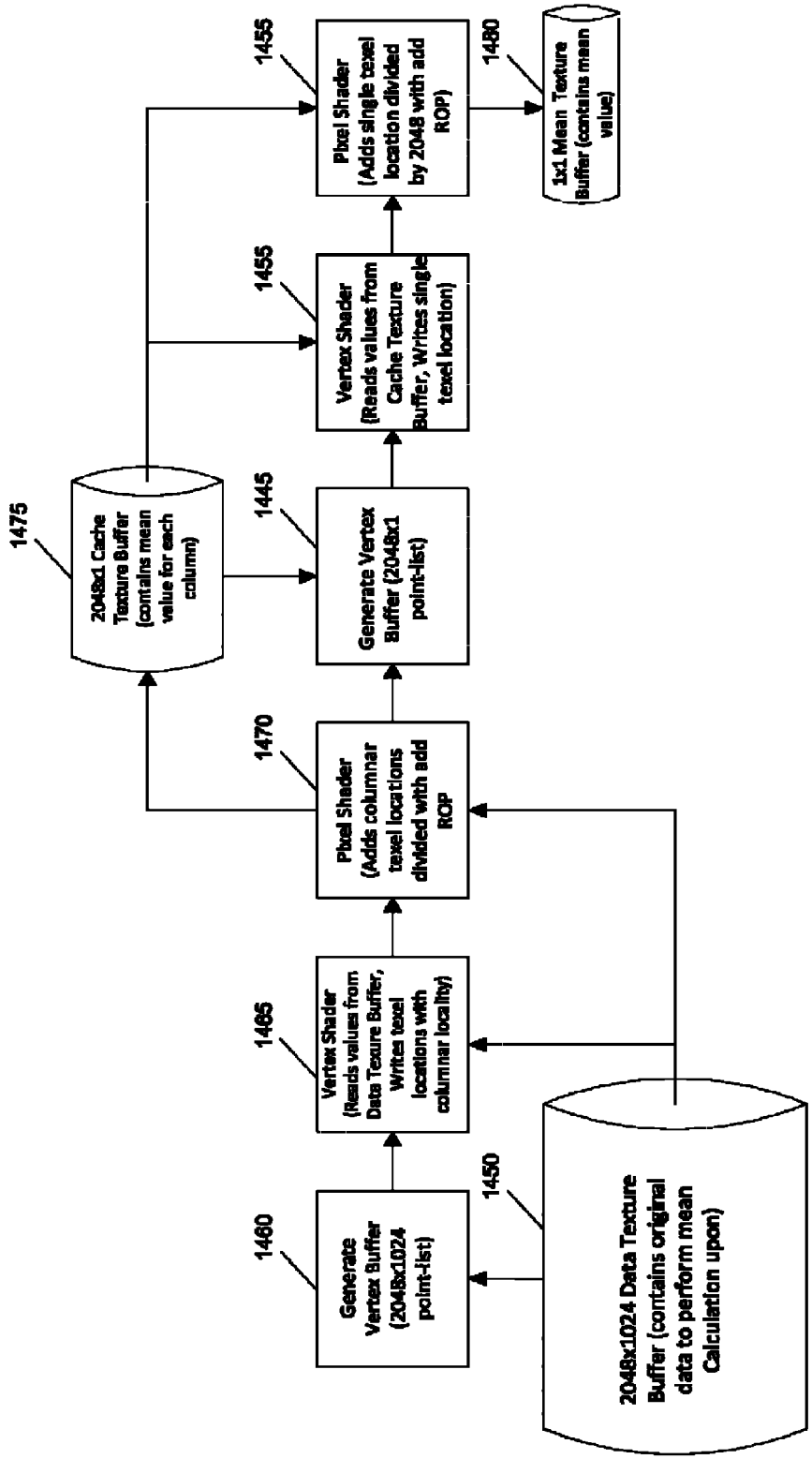
FIG. 14 is a block diagram of the example computing system of FIG. 1 adapted to compute a mean value of a data set using scatter-reduce-add operations.

FIG. 14 is a block diagram of the example computing system 100 of FIG. 1 adapted to compute a mean value of a data set using scatter-reduce-add operations. The elements of FIG. 14 are similar to those of FIGS. 1 and 10, except that that each of the summation values are divided by the height of a column of the original data set texture buffer 350 associated with the first pixel shader 370, and divided by the width or a row of the original data set texture buffer 350. This results in a final computation of the mean of a data set.

Figure 15A:
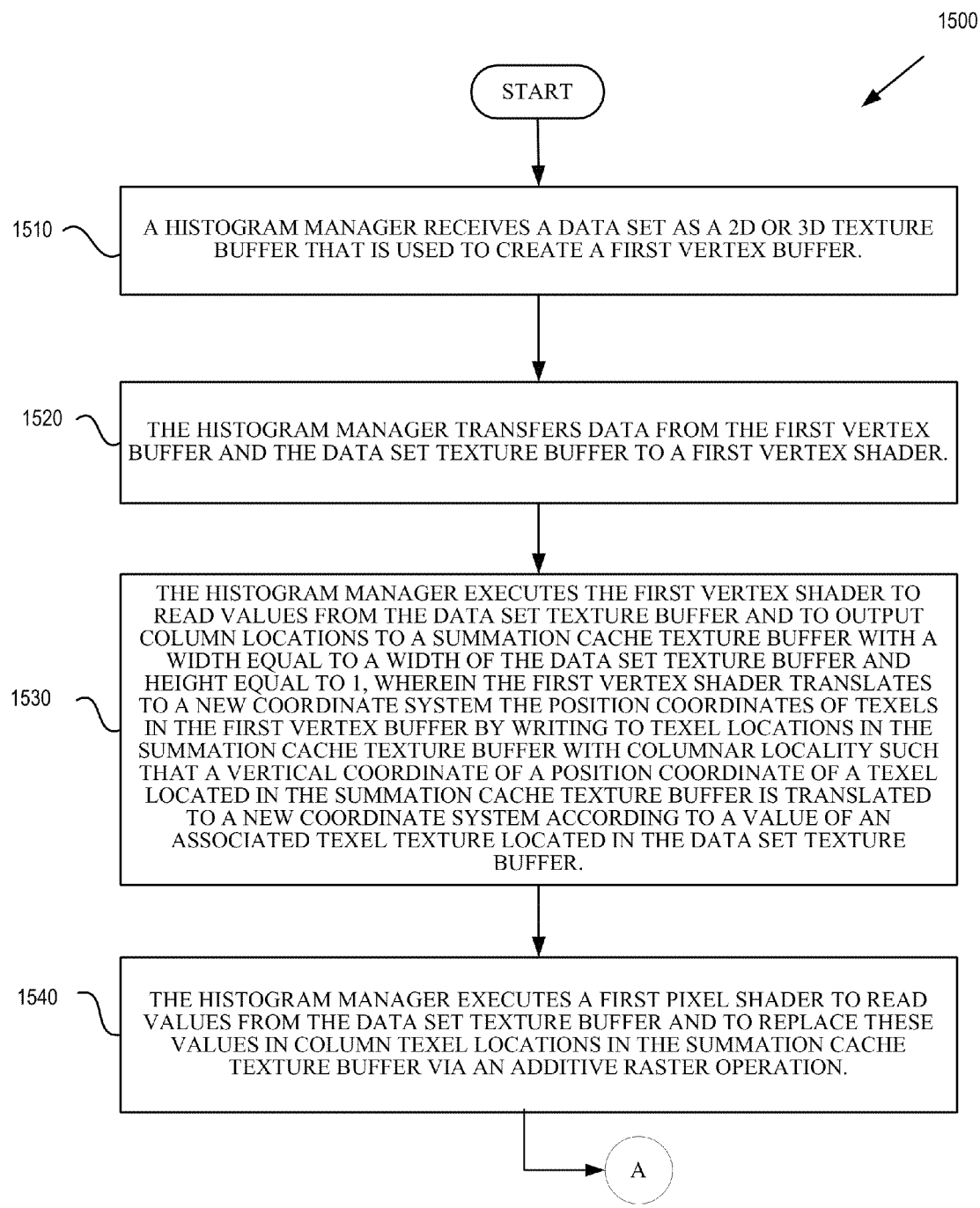
FIG. 15A-15B is a flow diagram illustrating an example of a method for computing a mean value of a data set using scatter-reduce-add operations.
Figure 15B:
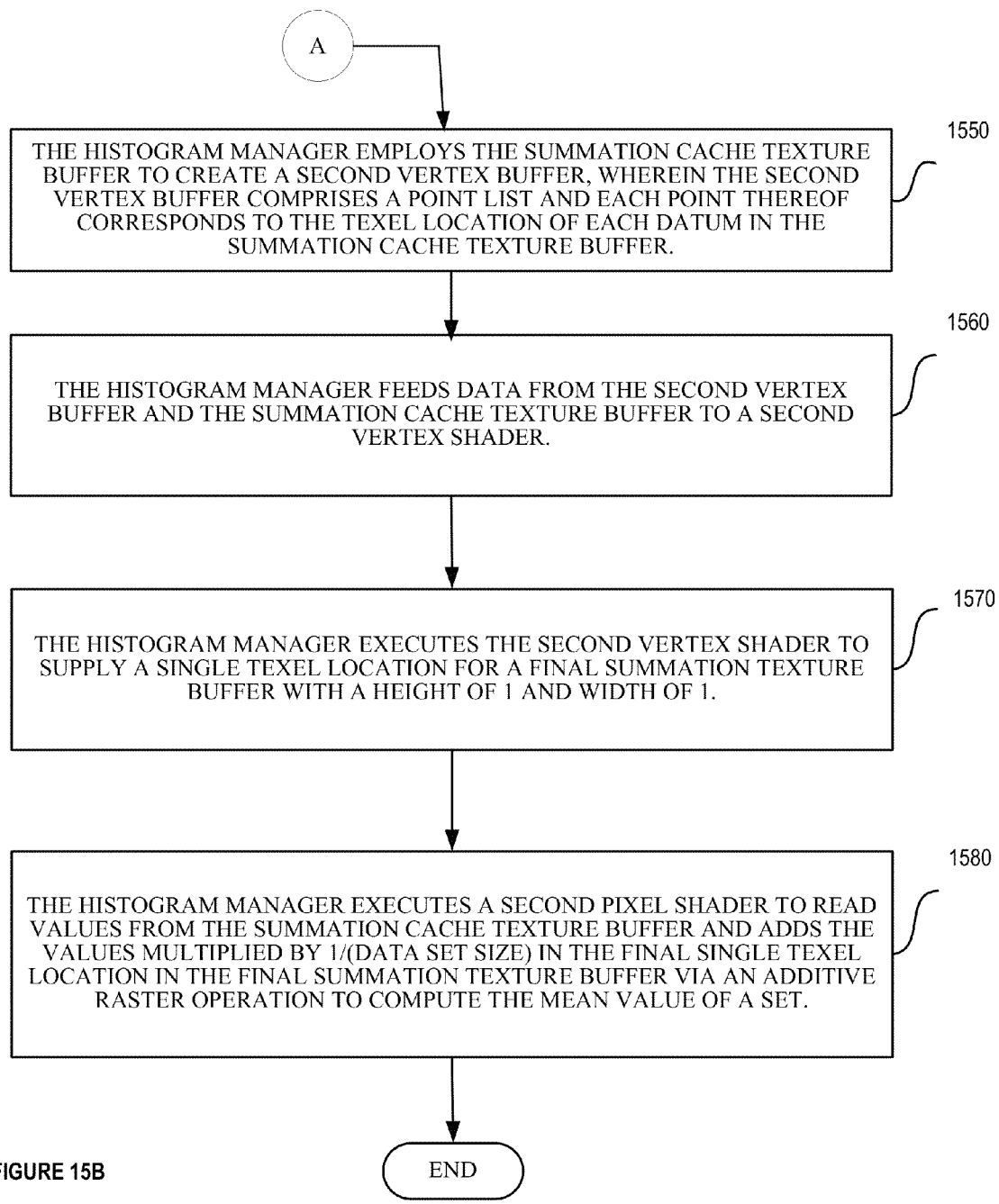

FIG. 15A-15B is a flow diagram illustrating an example of a method 1500 for computing a mean value of a data set using scatter-reduce-add operations. The method 1500 may be performed by a computer system 100 of FIG. 1 and may comprise hardware (e.g., circuitry, dedicated logic, programmable logic, microcode, etc.), software (e.g., instructions run on a processing device), or a combination thereof. In one example, the method 1500 is performed by the histogram manager 145 of the computing system 100 of FIG. 1.

As shown in FIG. 15A-15B, to permit the computing system 100 to compute a mean value of a data set, at block 1510, the histogram manager 145 receives a data set extant on the GPU 140 as a 2D or 3D texture buffer or a 2D or 3D texture buffer uploaded from the host system 120 to the GPU 140 that is used to create first vertex buffer 1460. The first vertex buffer 1460 comprises a point list and each point thereof corresponds to the texel location of each datum in the data set. At block 1420, the histogram manager 1445 transfers data from the first vertex buffer 1460 and a data set texture buffer 1450 to a first vertex shader 1465. At block 1530, histogram manager 145 executes the first vertex shader 1465 to read values from the data set texture buffer 1450 and to output column locations to a summation cache texture buffer 1485 with a width equal to a width of the data set texture buffer 1450 and height equal to 1. The first vertex shader 1465 further translates to a new coordinate system the position coordinates of texels in the first vertex buffer 1460 by writing to texel locations in a summation cache texture buffer 1485 with columnar locality such that a vertical coordinate of a position coordinate of a texel located in the summation cache texture buffer 1485 is translated to a new coordinate system according to a value of an associated texel texture located in the data set texture buffer 150. At block 1540, histogram manager 145 executes a first pixel shader 1470 to reads values from the data set texture buffer 1450 and to add these values in column texel locations in the summation cache texture buffer 1485 via an additive raster operation.

At block 1550, the histogram manager 145 employs the summation cache texture buffer 1485 to create a second vertex buffer 1445, wherein the second vertex buffer 1485 comprises a point list and each point thereof corresponds to the texel location of each datum in the summation cache texture buffer 1485. At block 1560, the histogram manager 145 feeds data from the second vertex buffer 1445 and the summation cache texture buffer 1485 to a second vertex shader 1455. At block 1570, the histogram manager 145 executes the second vertex shader 1455 to supply a single texel location for a final summation texture buffer 1490 with a height of 1 and width of 1. At block 1580, the histogram manager 145 executes the second pixel shader 1460 to read values from the summation cache texture buffer 1485 and adds the values multiplied by 1/(data set size) in the final single texel location in the final summation texture buffer 1490 via an additive raster operation to compute the mean value of a set.

Figure 16A:
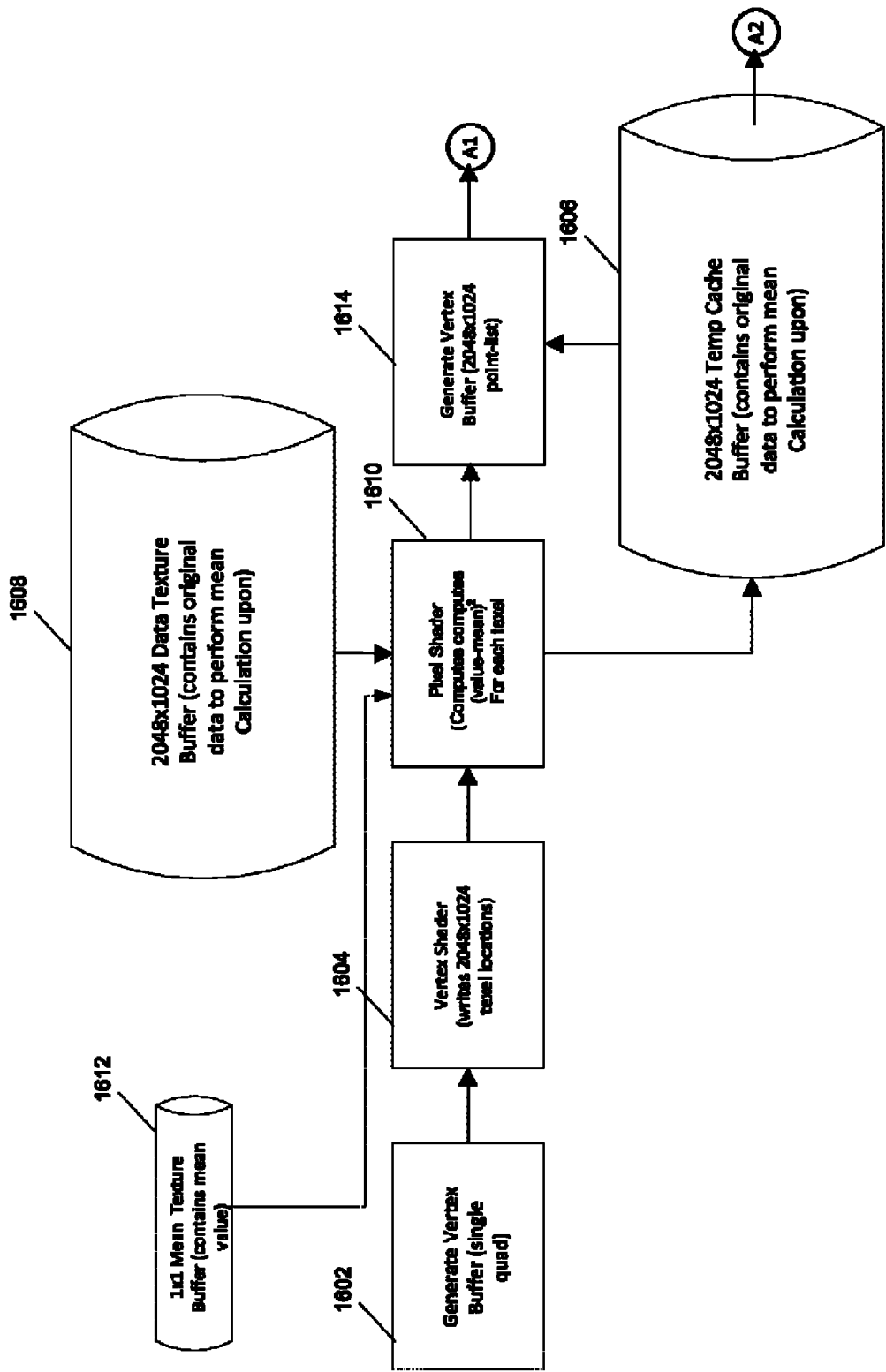
FIG. 16A-16C is a block diagram of the example computing system of FIG. 1 adapted to compute a standard deviation of a data set using scatter-reduce-add operations.
Figure 16B:
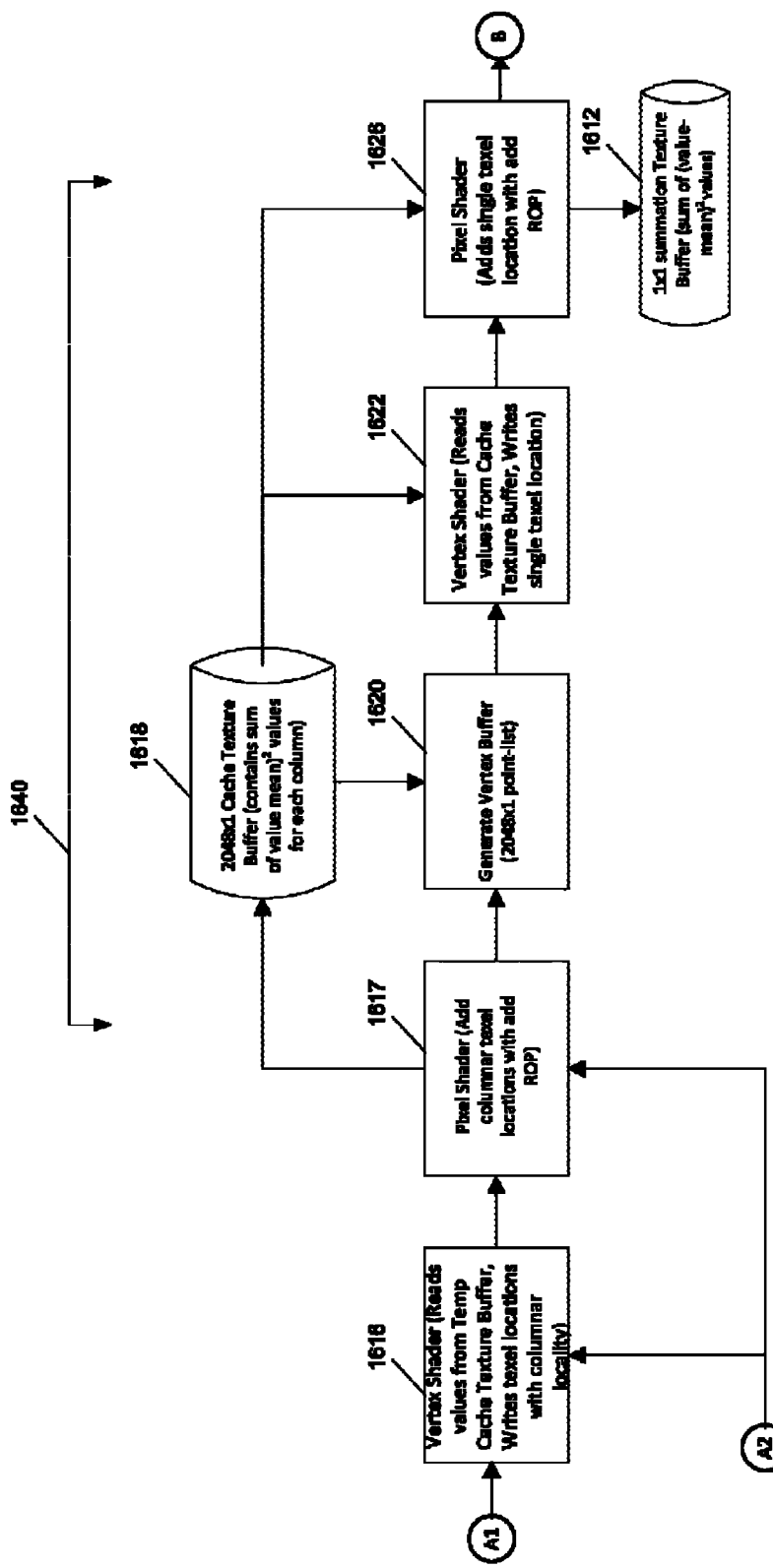
Figure 16C:
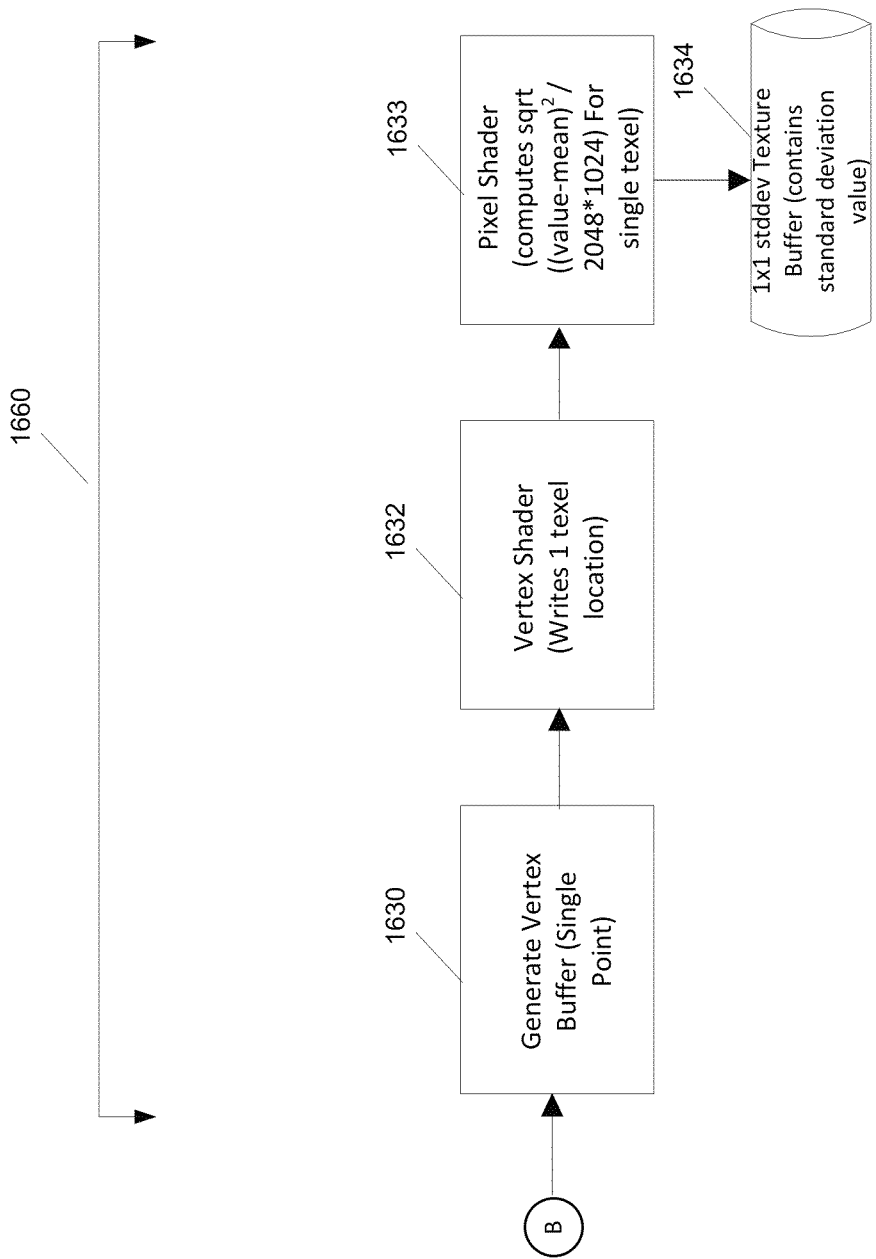

FIG. 16A-16C is a block diagram of the example computing system 100 of FIG. 1 adapted to compute a standard deviation of a data set using scatter-reduce-add operations. The elements of FIG. 16A-16C are similar to that of FIG. 14 with additional blocks 1650, 1660 for computing a standard deviation from a previously computed mean obtained using the system and method described in FIGS. 14 and 15. A pixel shader 1602 is employed to compute $(X-\overline{X})^2$ for each datum X in the data set, where $\overline{X}$ is the mean of the data set computed in FIG. 14 and the left half of FIG. 16A, resulting in a data set texture buffer 1608. The same D-dimensional scatter-reduce-addition block 1640 is executed as in the summation of a data set embodiment described in FIG. 12 upon the data set texture buffer 1608. In a final block 1660, a pixel shader 1632 operates on the data to obtain the summation $(X-\overline{X})^2$ to compute Equation 2, which gives the standard deviation of the data set:

$$\sqrt{\frac{\overline{(X-\overline{X})^2}}{\text{data set size}}} \quad (2)$$

In essence, combining the functionality of obtaining a mean of a data set of FIG. 14, the pixel shader 1602, the blocks/operations of obtaining a summation of a data set of FIG. 12, and the pixel shader 1632, efficiently obtains the standard deviation.

Figure 17A:
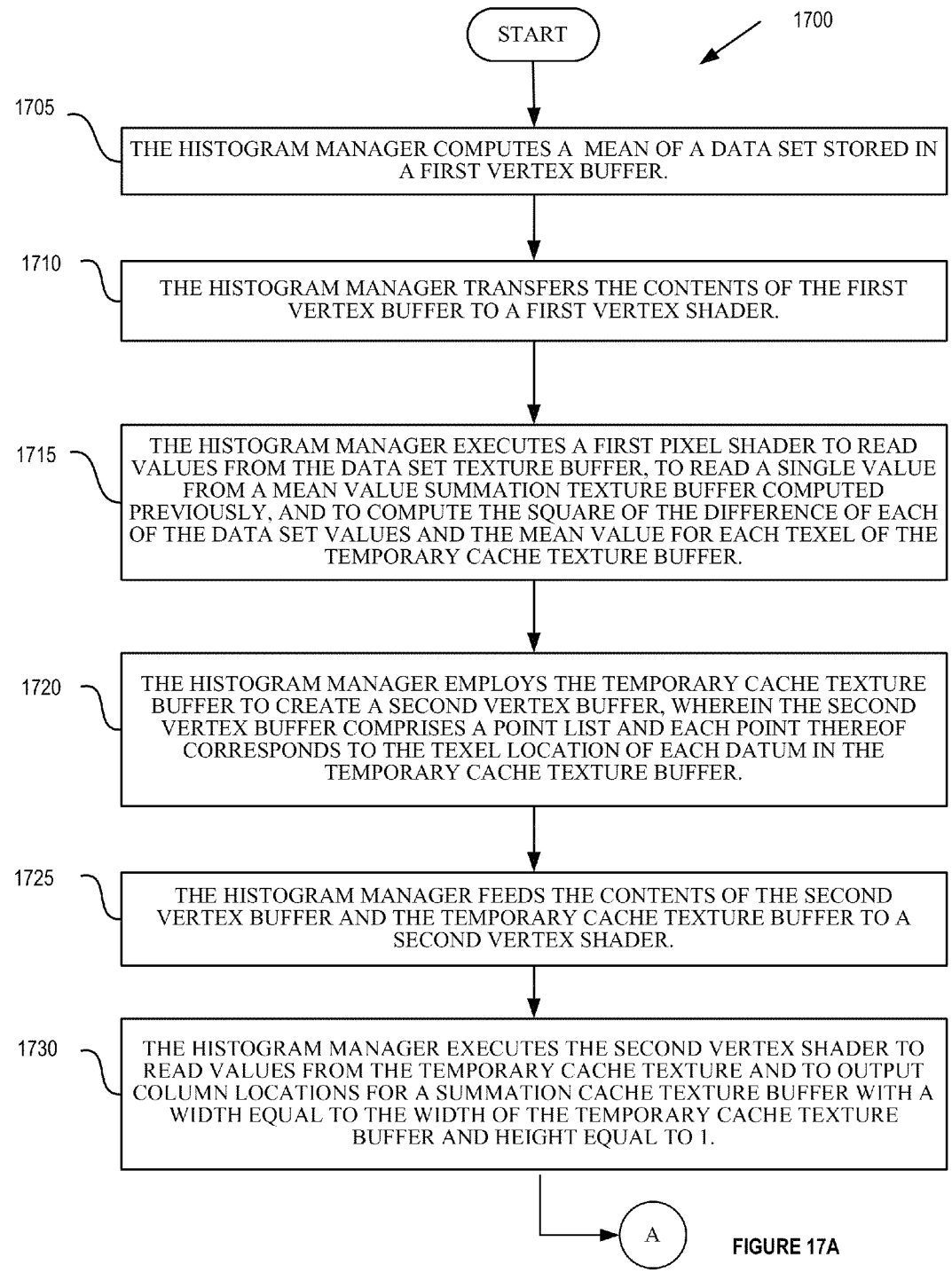
FIG. 17A-17C is a flow diagram illustrating an example of a method for computing a standard deviation of a data set using scatter-reduce-add operations.
Figure 17B:
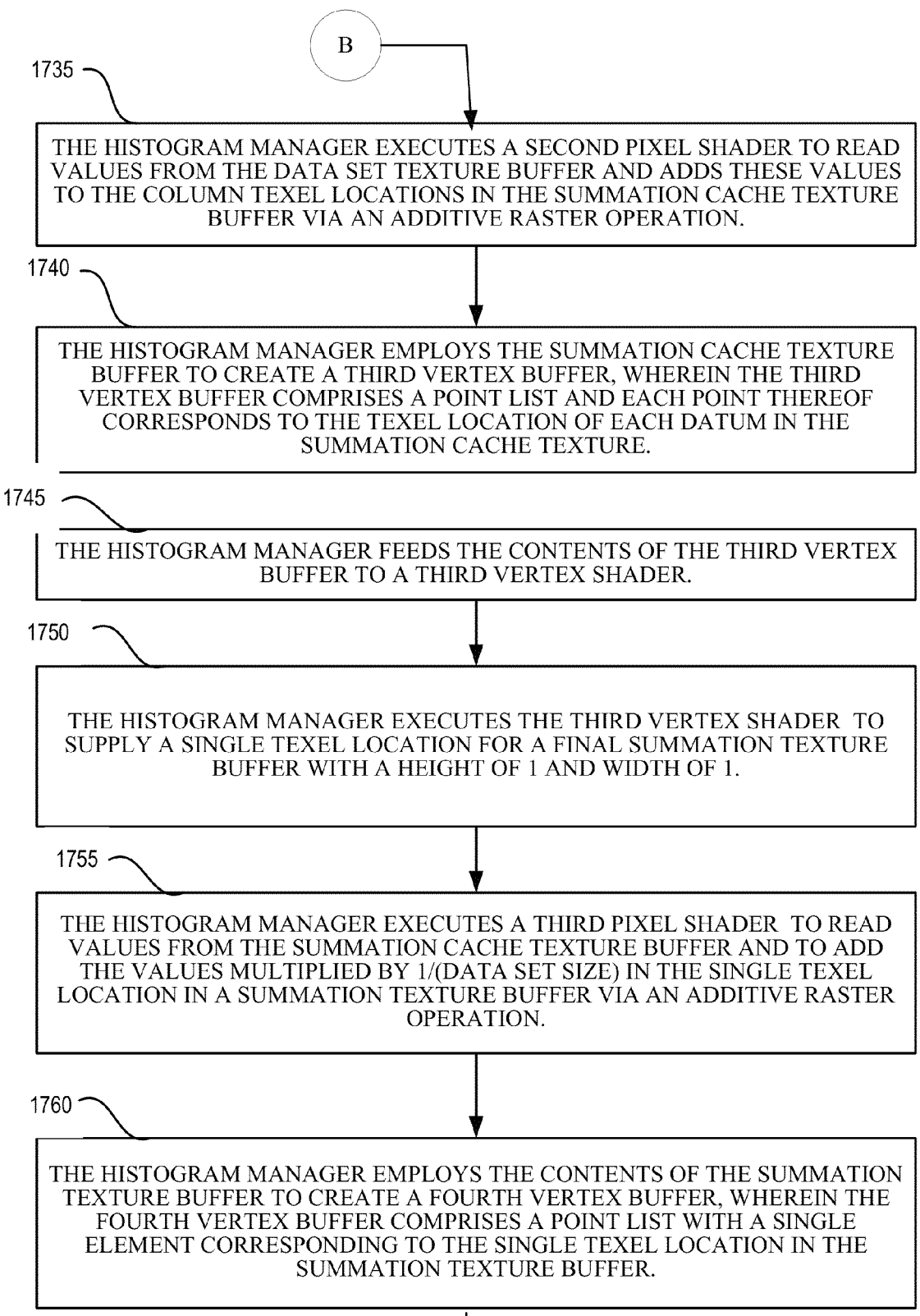
Figure 17C:
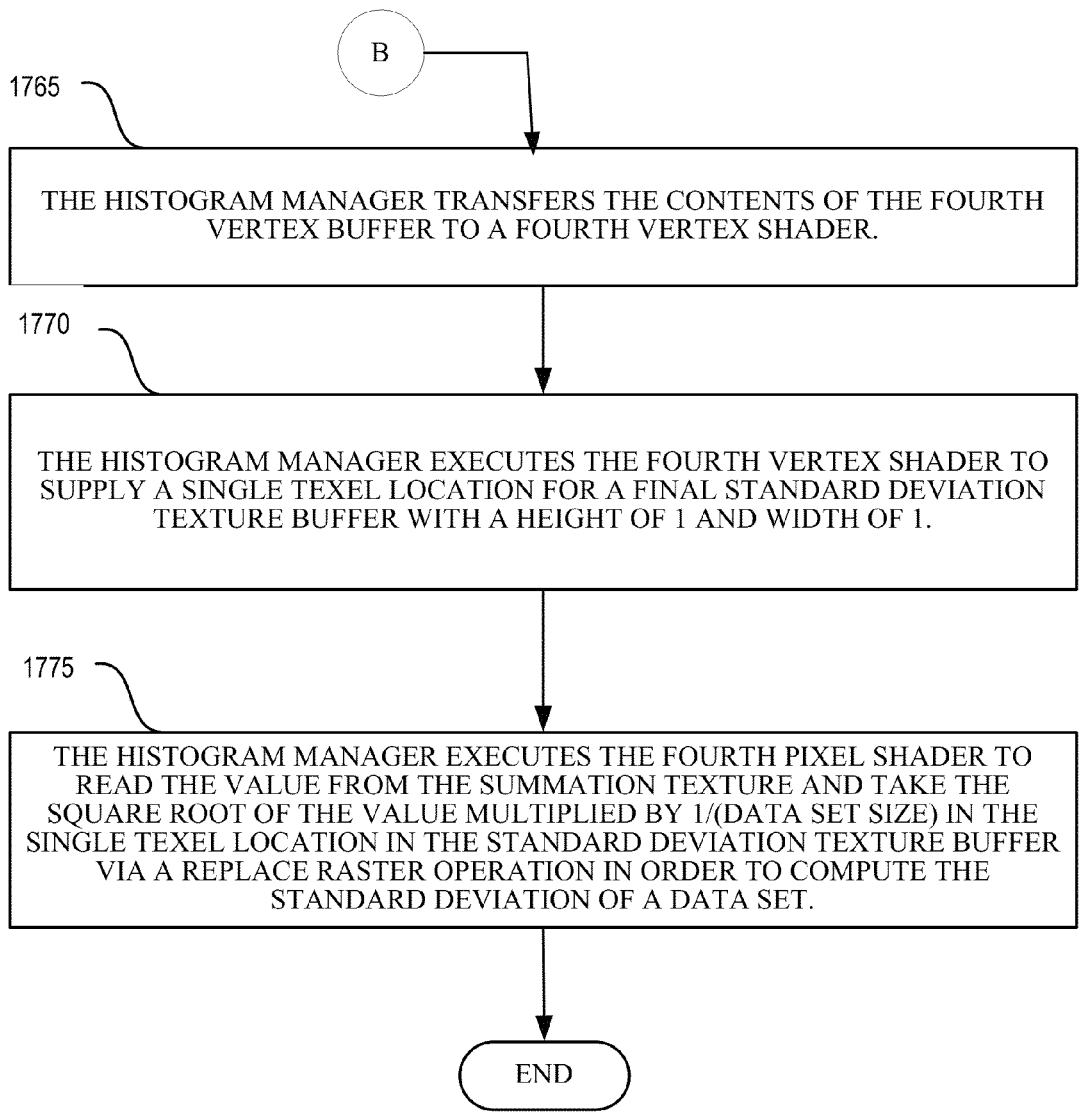

FIG. 17A-17C is a flow diagram is a flow diagram illustrating an example of a method 1700 for computing a standard deviation of a data set using scatter-reduce-add operations. The method 1700 may be performed by a computer system 100 of FIG. 1 and may comprise hardware (e.g., circuitry, dedicated logic, programmable logic, microcode, etc.), software (e.g., instructions run on a processing device), or a combination thereof. In one example, the method 1700 is performed by the histogram manager 145 of the computing system 100 of FIG. 1.

As shown in FIG. 17A-17C, to permit the computing system 100 to compute a standard deviation of a data set, at block 1705, the histogram manager 145 computes a mean of a data set stored in a first vertex buffer 1602. The first vertex buffer 1602 comprises a single quad with identity dimensions with respect to the data set texture buffer 1408. At block 1710, the histogram manager 145 transfers the contents of the first vertex buffer 1602 to a first vertex shader 1604. The first vertex shader 1604 supplies texel locations for a temporary cache texture buffer 1606 with a width and height equal to the data set texture buffer 1608. At block 1715, the histogram manager 145 executes a first pixel shader 1610 to read values from the data set texture buffer 1408, to read a single value from a mean value summation texture buffer 1612 computed previously, and to compute the square of the difference of each of the data set values and the mean value for each texel of the temporary cache texture buffer 1606.

At block 1720, the histogram manager 145 employs the temporary cache texture buffer 1606 to create a second vertex buffer 1614. The second vertex buffer 1614 comprises a point list and each point thereof corresponds to the texel location of each datum in the temporary cache texture buffer 1606. At block 1725, the histogram manager 145 feeds the contents of the second vertex buffer 1614 and the temporary cache texture buffer 1606 to a second vertex shader 1616. At block 1730, the histogram manager 145 executes the second vertex shader 1616 to read values from the temporary cache texture 1606 and to output column locations for a summation cache texture buffer 1618 with a width equal to the width of the temporary cache texture buffer 1606 and height equal to 1. At block 1735, the histogram manager 145 executes a second pixel shader 1617 to read values from the data set texture buffer 1408 and adds these values to the column texel locations in the summation cache texture buffer 1412 via an additive raster operation.

At block 1740, the histogram manager 145 employs the summation cache texture buffer to create a third vertex buffer 1620. The third vertex buffer 1620 comprises a point list and each point thereof corresponds to the texel location of each datum in the summation cache texture 1612. At block 1745, the histogram manager 145 feeds the contents of the third vertex buffer 1620 to a third vertex shader 1622. At block 1750, the histogram manager 145 executes the third vertex shader 1622 to supply a single texel location for a final summation texture buffer 1624 with a height of 1 and width of 1. At block 1755, the histogram manager 145 executes a third pixel shader 1626 to read values from the summation cache texture buffer 1624 and to add the values multiplied by 1/(data set size) in the single texel location in a summation texture buffer 1628 via an additive raster operation.

At block 1760, the histogram manager 145 employs the contents of the summation texture buffer 1628 to create a fourth vertex buffer 1630. The fourth vertex buffer 1630 comprises a point list with a single element corresponding to the single texel location in the summation texture buffer 1628. At block 1765, the histogram manager 145 transfers the contents of the fourth vertex buffer 1630 to a fourth vertex shader 1632. At block 1770, the histogram manager 145 executes the fourth vertex shader 1632 to supply a single texel location for a final standard deviation texture buffer 1634 with a height of 1 and width of 1. At block 1775, the histogram manager 145 executes the fourth pixel shader 1633 to read the value from the summation texture and take the square root of the value multiplied by 1/(data set size) in the single texel location in the standard deviation texture buffer 1634 via a replace raster operation in order to compute the standard deviation of a data set.

Figure 18:
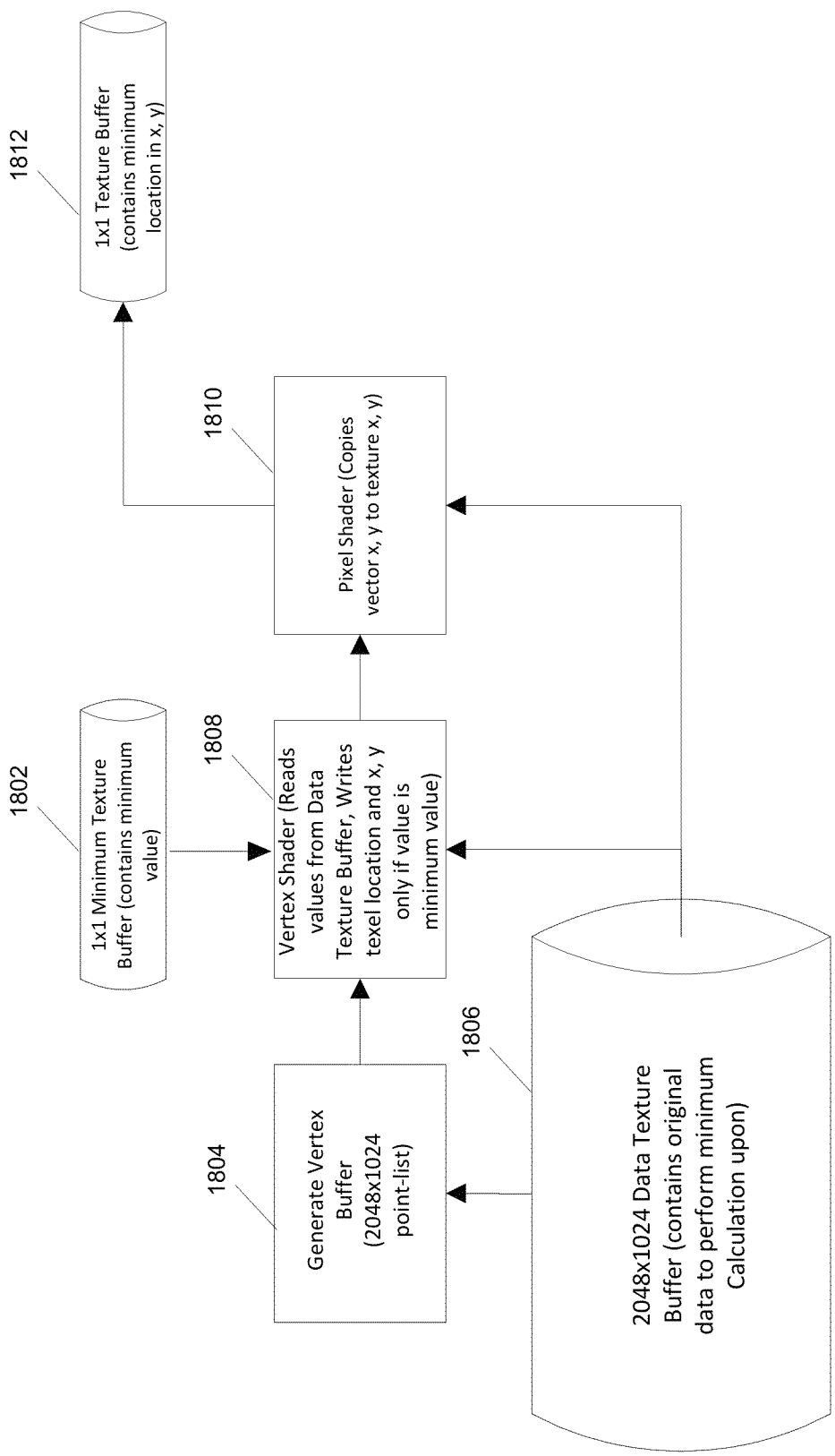
FIG. 18 is a block diagram of the example computing system of FIG. 1 adapted to extend a minimum value of a data set calculation of FIG. 8 in order to determine the location of a given minimum value within a data set.

FIG. 18 is a block diagram the example computing system 100 of FIG. 1 adapted to extend a minimum value of a data set calculation of FIG. 8 in order to determine the location of a given minimum value within a data set. Given a 1×1 previously computed minimum texture buffer 1802, the histogram manager 145 is configured to generate a first vertex buffer 1804 that comprises a point-list, which is a set of (x,y) or (x,y,z) coordinates retrieved by the histogram manager 145 from a data set texture buffer 1806. Next, the histogram manager 145 executes a vertex shader 1808 that outputs a valid destination coordinate and an (x,y) or (x,y,z) location to a single pixel (width and height equal to 1) if and only if the texel coordinate in the data set texture buffer 1804 is equal to the minimum value, otherwise a negative location is output which ensures a subsequent pixel shader 1810 only operates with the minimum value. In the case of multiple equal minimum values, the location returned will be nondeterministic. However, one skilled in the art can surmise that a way to reliably determine all locations of multiple equal minima is to recursively apply the function as depicted in FIG. 18, clear the minimum value in the original data set with a NaN (not-a-number) value, and run the function again until the minimum changes.

Figure 19:
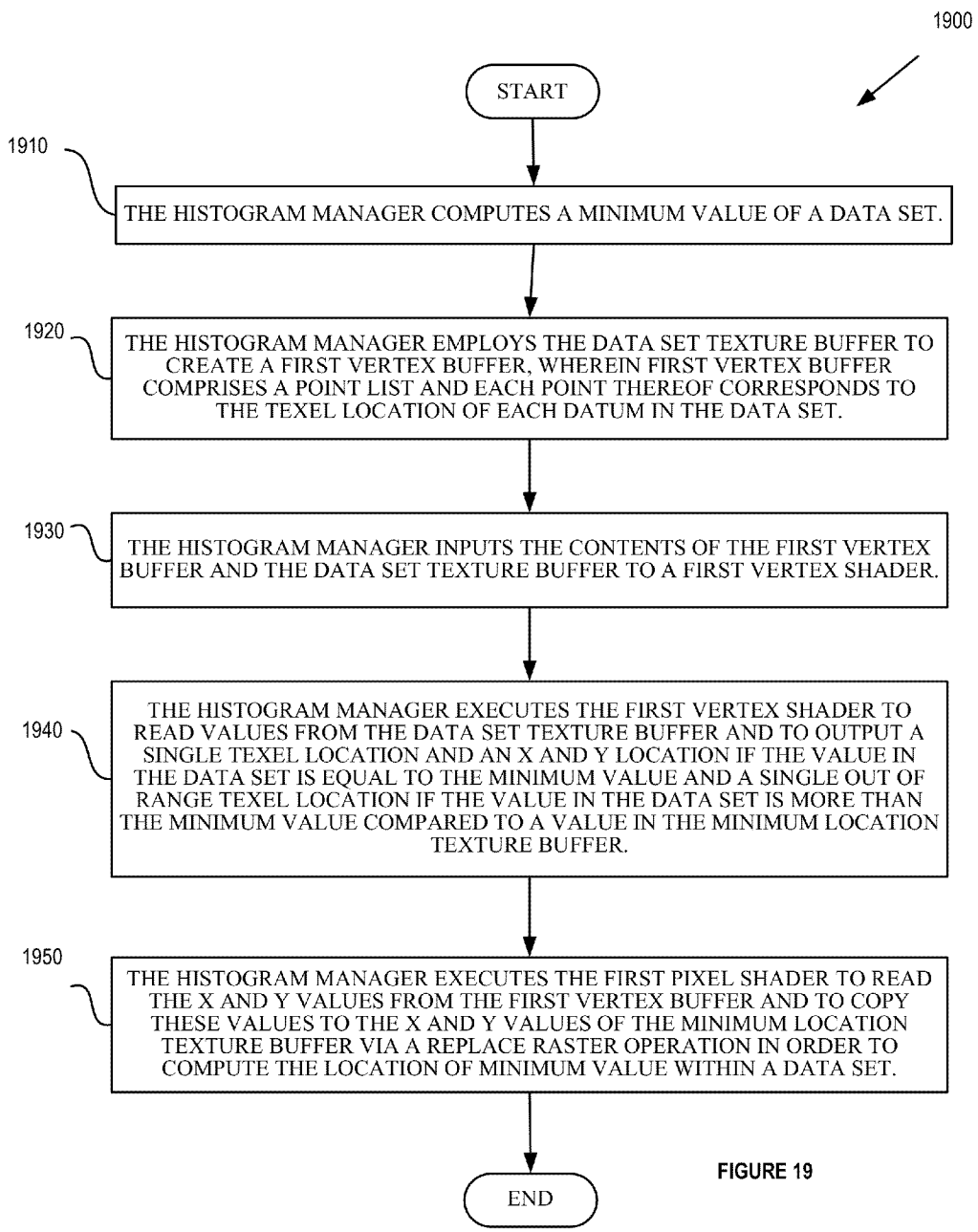
FIG. 19 is a flow diagram illustrating an example of a method for computing a location of a minimum value within a data set.

FIG. 19 is a flow diagram illustrating an example of a method 1900 for computing a location of a minimum value within a data set. The method 1900 may be performed by a computer system 100 of FIG. 1 and may comprise hardware (e.g., circuitry, dedicated logic, programmable logic, microcode, etc.), software (e.g., instructions run on a processing device), or a combination thereof. In one example, the method 1900 is performed by the histogram manager 145 of the computing system 100 of FIG. 1.

As shown in FIG. 19, to permit the computing system 100 to compute a location of a minimum value within a data set, at block 1910, the histogram manager 145 computes the minimum of the data set. At block 1920, the histogram manager 145 employs the data set texture buffer 1806 to create the first vertex buffer 1804. The first vertex buffer 1804 comprises a point list and each point thereof corresponds to the texel location of each datum in the data set. At block 1930, the histogram manager 145 inputs the contents of the first vertex buffer 1804 and the data set texture buffer 1806 to the first vertex shader 1808. At block 1940, the histogram manager 145 executes the first vertex shader 1808 to read values from the data set texture buffer 1806 and to output a single texel location and an x and y location if the value in the data set is equal to the minimum value and a single out of range texel location if the value in the data set is more than the minimum value compared to a value in the minimum location texture buffer 1802 with a width and height equal to 1. At block 1950, the histogram manager 145 executes the first pixel shader 1810 to read the x and y values from the first vertex buffer 1804 and to copy these values to the x and y values of the minimum location texture buffer 1812 via a replace raster operation in order to compute the location of minimum value within a data set.

Figure 20:
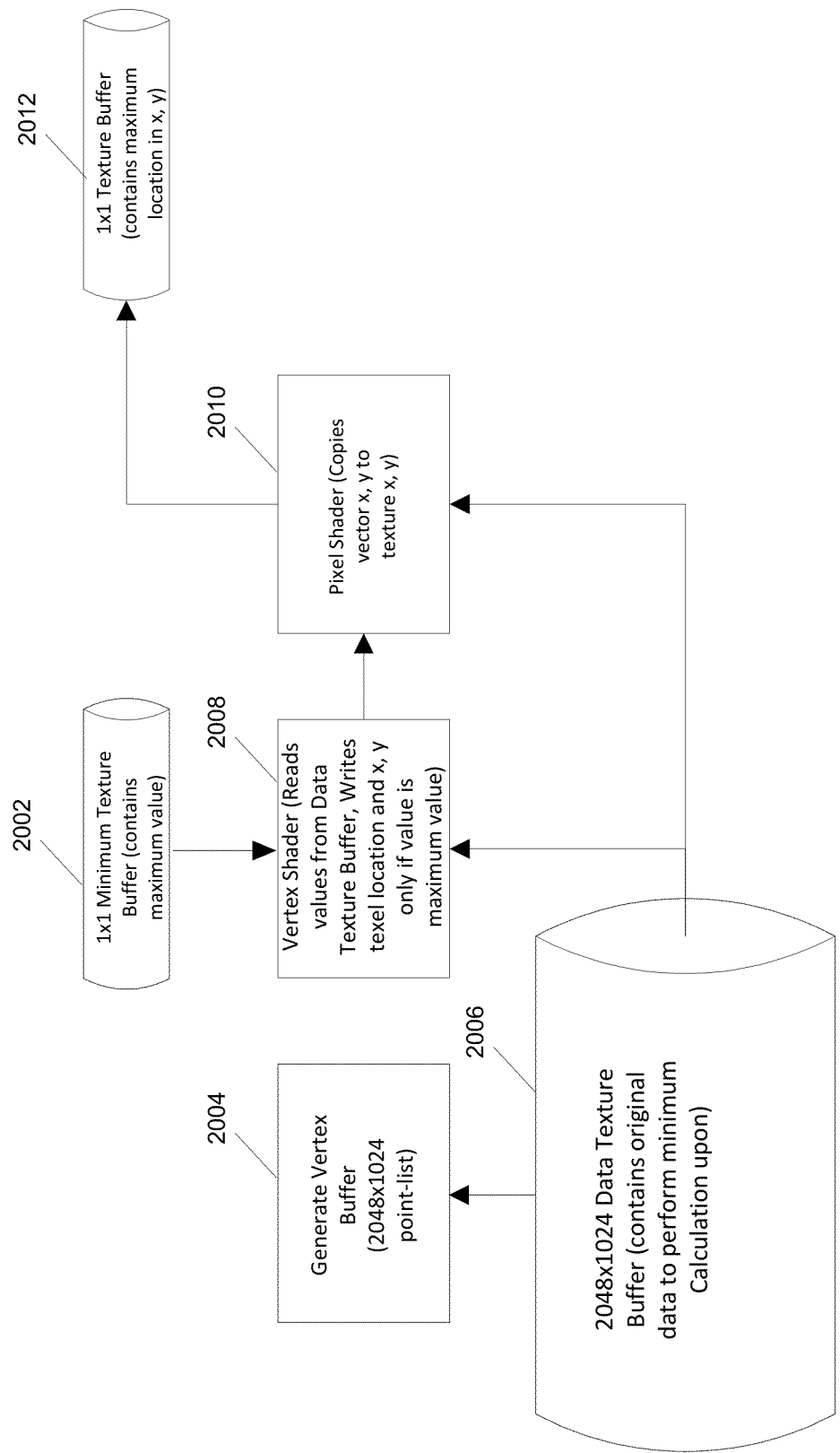
FIG. 20 is a block diagram of the example computing system of FIG. 1 adapted to extend a minimum value of a data set calculation of FIG. 10 in order to determine the location of a given maximum value within a data set.

FIG. 20 is a block diagram of the example computing system 100 of FIG. 1 adapted to extend a minimum value of a data set calculation of FIG. 10 in order to determine the location of a given maximum value within a data set. Given a 1×1 previously computed maximum texture buffer 2002, the histogram manager 145 is configured to generate a first vertex buffer 2004 comprising a point-list, which is a set of (x,y) or (x,y,z) coordinates retrieved by the histogram manager 145 from a data set texture buffer 2006. Next, the histogram manager 145 is configured to execute a vertex shader 2008 that outputs a valid destination coordinate and an (x,y) or (x,y,z) location to a single pixel (width and height equal to 1) if and only if the texel coordinate in the data set texture buffer 2006 is equal to the maximum value, otherwise a negative location is output which ensures the subsequent pixel shader 2010 only operates with the minimum value. In the case of multiple equal maximum values, the location returned will be nondeterministic. However one skilled in the art can surmise that a way to reliably determine all locations of multiple equal maxima is to recursively apply the function as depicted in FIG. 20, clear the maximum value in the original data set with a NaN (not-a-number) value, and run the function again until the maximum changes.

Figure 21:
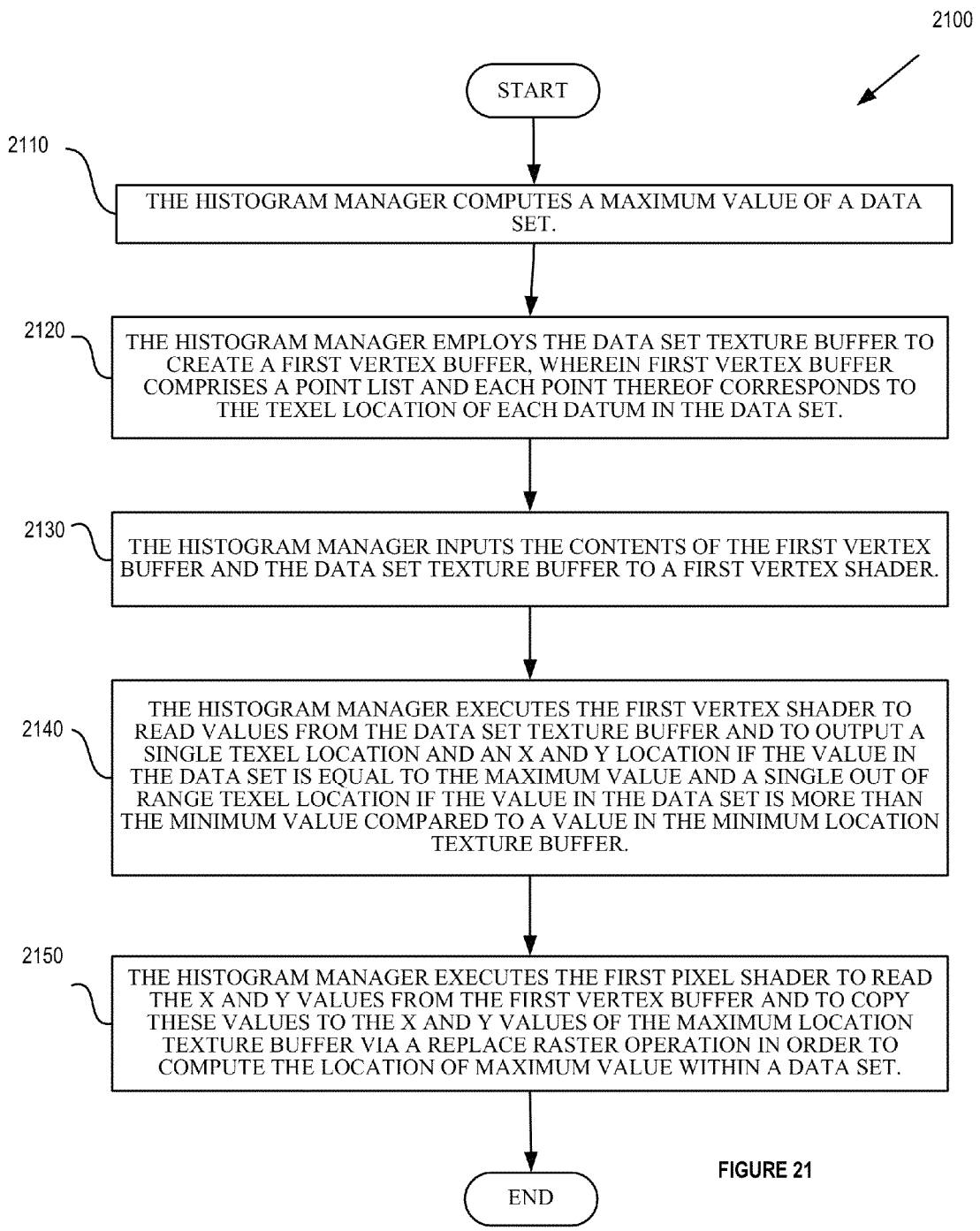
FIG. 21 is a flow diagram illustrating an example of a method for computing a location of a maximum value within a data set.

FIG. 21 is a flow diagram illustrating an example of a method 2100 for computing a location of a maximum value within a data set. The method 2100 may be performed by a computer system 100 of FIG. 1 and may comprise hardware (e.g., circuitry, dedicated logic, programmable logic, microcode, etc.), software (e.g., instructions run on a processing device), or a combination thereof. In one example, the method 2100 is performed by the histogram manager 145 of the computing system 100 of FIG. 1.

As shown in FIG. 21, to permit the computing system 100 to compute a location of a maximum value within a data set, at block 2110, the histogram manager 145 computes the maximum of the data set. At block 2120, the histogram manager 145 employs the data set texture buffer 2006 to create the first vertex buffer 2004. The first vertex buffer 2004 comprises a point list and each point thereof corresponds to the texel location of each datum in the data set. At block 2130, the histogram manager 145 inputs the contents of the first vertex buffer 2004 and the data set texture buffer 2006 to the first vertex shader 2008. At block 2140, the histogram manager 145 executes the first vertex shader 2008 to read values from the data set texture buffer 2006 and to output a single texel location and an x and y location if the value in the data set is equal to the maximum value and a single out of range texel location if the value in the data set is more than the maximum value compared to a value in the maximum location texture buffer 2002 with a width and height equal to 1. At block 2150, the histogram manager 145 executes the first pixel shader 2010 to read the x and y values from the first vertex buffer 2004 and to copy these values to the x and y values of the maximum location texture buffer 2012 via a replace raster operation in order to compute the location of maximum value within a data set.

The present invention has several advantages over prior art methods of computing histograms and related statistical functions. The arrangement of the scatter-reduce framework to reduce dimensionality of the dataset is aligned with the caching behavior of modern and previous GPUs, which permits greatly increased performance. The scatter-reduce framework is generalized to perform functions ranging from histogram computation to finding the median and mode of a data set, with high efficiency, well-defined behavior even with data sets possessing high modality. The process is efficient enough to perform in greater-than-real-time for 4K video resolution video at 30 fps on contemporaneous, commercial, mass-marketed computer hardware, which opens up new applications. These applications include, but are not limited to, color processing, improved video coder efficiency, shot change detection, motion-compensated de-interlacing and framerate conversion, and object segmentation for real-time scene analysis, photogrammetry, and metrography.

Figure 22:
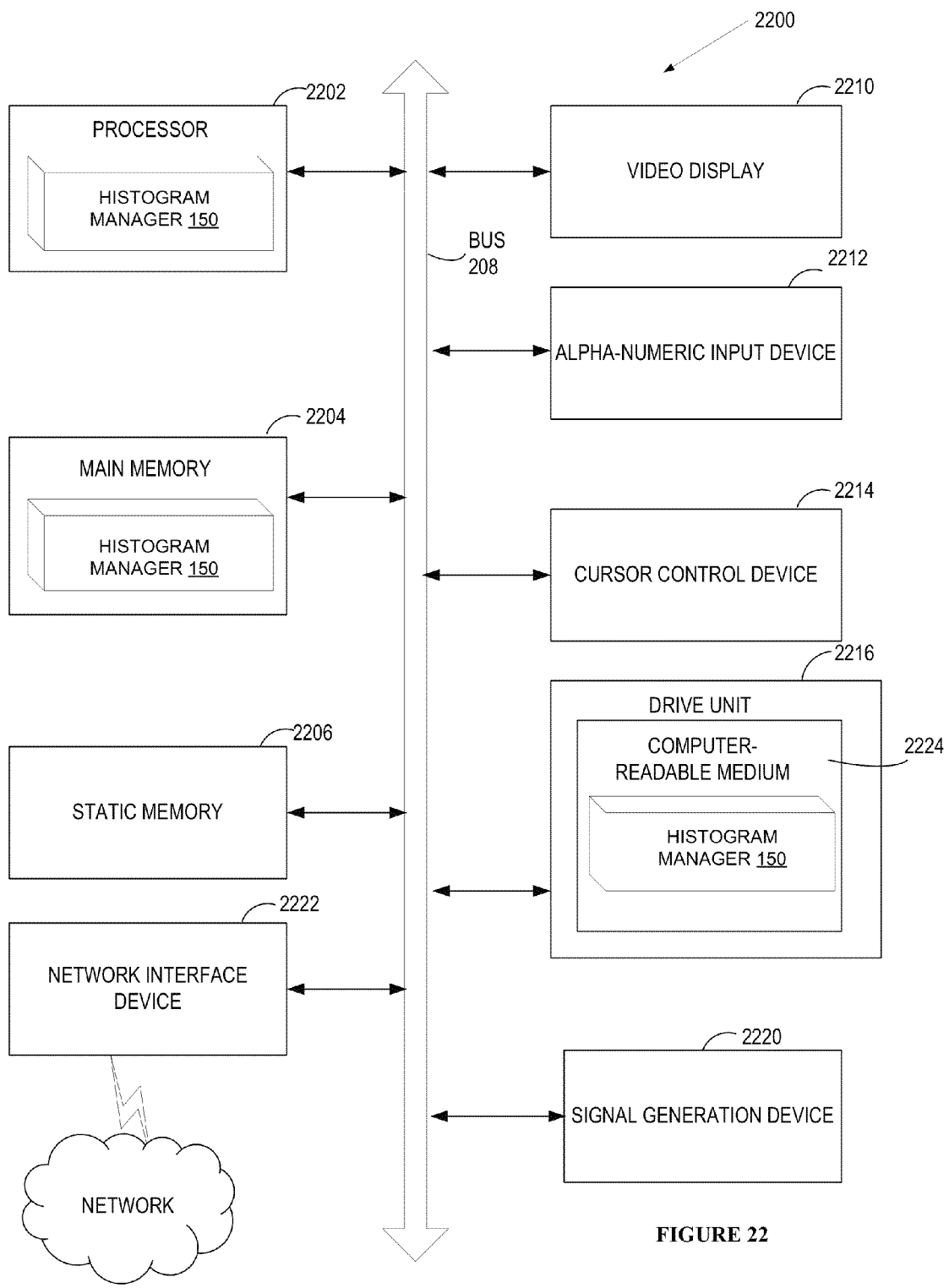
FIG. 22 illustrates a diagrammatic representation of a machine in the example form of a computer system within which a set of instructions, for causing the machine to perform any one or more of the methodologies discussed herein, may be executed.

FIG. 22 illustrates a diagrammatic representation of a machine in the example form of a computer system 2200 within which a set of instructions, for causing the machine to perform any one or more of the methodologies discussed herein, may be executed. In some examples, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2200 includes a processing device (processor) 2202, a main memory 2204 (e.g., read-only memory (ROM), flash memory, dynamic random access memory (DRAM) such as synchronous DRAM (SDRAM)), a static memory 2206 (e.g., flash memory, static random access memory (SRAM)), and a data storage device 2216, which communicate with each other via a bus 2208.

Processor 2202 represents one or more general-purpose processing devices such as a microprocessor, central processing unit, or the like. More particularly, the processor 2202 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 2202 may also be one or more special-purpose processing devices such as an application specific integrated circuit (ASIC), a field programmable gate array (FPGA), a digital signal processor (DSP), network processor, or the like. The histogram manager 145 shown in FIG. 1 may be executed by processor 2202 configured to perform the operations and steps discussed herein.

The computer system 2200 may further include a network interface device 2222. The computer system 2200 also may include a video display unit 2210 (e.g., a liquid crystal display (LCD) or a cathode ray tube (CRT)), an alphanumeric input device 2212 (e.g., a keyboard), a cursor control device 2214 (e.g., a mouse), and a signal generation device 2220 (e.g., a speaker).

A drive unit 2216 may include a computer-readable medium 2224 on which is stored one or more sets of instructions (e.g., instructions of the histogram manager 145)

embodying any one or more of the methodologies or functions described herein. The instructions of the histogram manager 145 may also reside, completely or at least partially, within the main memory 2204 and/or within the processor 2202 during execution thereof by the computer system 2200, the main memory 2204 and the processor 2202 also constituting computer-readable media. The instructions of the histogram manager 145 may further be transmitted or received over a network via the network interface device 2222.

While the computer-readable storage medium 2224 is shown in an example to be a single medium, the term "computer-readable storage medium" should be taken to include a single non-transitory medium or multiple non-transitory media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It is apparent, however, to one of ordinary skill in the art having the benefit of this disclosure, that examples of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "writing", "maintaining", or the like, refer to the actions and processes of a computer system, or similar electronic computing device, that manipulates and translates to a new coordinate system the data represented as physical (e.g., electronic) quantities within the computer system's registers and memories into other data similarly represented as physical quantities within the computer system memories or registers or other such information storage, transmission or display devices.

Examples of the disclosure also relate to an apparatus for performing the operations herein. This apparatus may be specially constructed for the required purposes, or it may comprise a general purpose computer selectively activated or reconfigured by a computer program stored in the computer. High-throughput histogram and statistical computation as disclosed herein solves problems in many fields, such as the shot change detection system and method taught in the '384 patent, color equalization and contrast enhancement for real-time video on mobile devices possessing a GPU or APU, finding of maximum values of a Hough transform as utilized by contemporary MRI and other 3D scanning systems where the histogram maximum value is used to identify prominent line segments in the 3D volume, and character mode and frequency analysis steps in high-throughput cryptanalysis systems as but a few examples. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. Example structure for a variety of these systems appears from the description herein. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other examples will be apparent to those of skill in the art upon reading and understanding the above description. The scope of the disclosure should, therefore, be determined with reference to the appended claims, along with the full scope of equivalents to which such claims are entitled.

What is claimed is:

1. A method, comprising:
   receiving, at a processing device from a first buffer, a data set of texels, wherein the data set has a dimensionality D of at least two and wherein each texel contains a value;
   sorting, using the processing device, the data set into a point list of coordinates, wherein a point in the point list corresponds to a texel location in the data set;
   reducing the dimensionality of the point list by arranging points in the point list according to an N−1 dimensional dominancy, wherein reducing the dimensionality of the point list comprises performing a vertex shader pass to inform a subsequent pixel shader pass of destination bin locations;
   performing a raster operation on each associated value of the arranged points in the destination bin locations to obtain at least one value;
   outputting the at least one value to a second buffer; and
   repeating said sorting, reducing, performing, and outputting until D is one.

2. The method of claim 1, wherein sorting the data set comprises generating a vertex buffer with individual vertices for each texel location.

3. The method of claim 1, wherein performing a raster operation comprises performing at least one of a replacement raster operation, an additive raster operation, a minimum raster operation, or a maximum raster operation.

4. The method of claim 1, wherein the outputted the at least one value is at least one of a histogram of the data set, a maximum value of the data set, the minimum value of the data set, a summation value of the data set, a mean, median, or mode value of a data set, a standard deviation value of the data set, a location of the minimum value of a data set, or a location of the maximum value of a data set.

5. The method of claim 1, wherein the data set of texels is received in the first buffer from two-dimensional or three-dimensional still images or video.

6. The method of claim 1, wherein D is two or three.

7. The method of claim 1, further comprising transmitting the at least one value to one or more downstream devices for use in video processing applications.

8. A method, comprising:
   receiving, at a processing device from a first buffer, a two-dimensional data set of texels, wherein each texel in the data set contains a value;
   sorting, using the processing device, the data set from the first buffer into a point list of coordinates in a second buffer, wherein a point in the point list corresponds to a texel location in the data set;
   reading values from the second buffer and outputting column locations to a third buffer according to an N−1 dimensional dominancy with a width equal to a first size and height equal to a second size;
   incrementing values by one in the column texel locations in the third buffer using an additive raster operation to obtain at least one value; and
   outputting the at least one value to a fourth buffer.

9. The method of claim 8, wherein the first size and the second size correspond to a histogram bin size.

10. The method of claim 8, wherein outputting column locations to a third buffer with a width equal to a first size and height equal to a second size further comprises translating to a new coordinate system the position coordinates of texels in the second buffer by writing to texel locations in the third buffer with columnar locality such that a vertical coordinate of a position coordinate of a texel located in the second buffer is translated to a new coordinate system according to a value of an associated texel texture located in the first buffer.

11. The method of claim 10, wherein incrementing values comprises incrementing a texel value of the third buffer by one for every texel location that the position coordinate directs it to operate upon.

12. The method of claim 8, further comprising outputting, to the fourth buffer, bin texel locations with a height of 1 and width equal to a final histogram bin size.

13. The method of claim 12, further comprising increment by one the values in the fourth buffer using the additive raster operation to obtain a histogram.

14. The method of claim 8, wherein the first size corresponds to a width of the first buffer and the second size corresponds to height equal to one.

15. The method of claim 8, wherein performing a raster operation comprises performing at least one of a replacement raster operation, an additive raster operation, a minimum raster operation, or a maximum raster operation.

16. The method of claim 8, further comprising outputting to the fourth buffer bin texel locations with a height of one and width equal to one.

17. The method of claim 8, further comprising replacing values in the fourth buffer using a minimum raster operation to obtain a minimum value of the data set.

18. The method of claim 8, further comprising replacing values in the fourth buffer using a summation raster operation to obtain a summation value of the data set.

19. The method of claim 18, wherein replacing values in the fourth buffer further comprises multiplying the values in the fourth buffer by one divided by a size of the data set to obtain a mean of the data set.

20. The method of claim 8, further comprising transmitting the at least one value to one or more downstream devices for use in video processing applications.

21. A method, comprising:
   computing a minimum value or a maximum value of a two-dimensional data set of texels;
   receiving, at a processing device from a first buffer, the two-dimensional data set of texels, wherein each texel in the data set is associated with a value;
   sorting, using the processing device, the data set from the first buffer into a point list of coordinates in a second buffer, wherein a point in the point list corresponds to a texel location in the data set;
   reading a texel value from the second buffer and outputting a single texel location and x and y values to a third buffer according to an N−1 dimensional dominancy if the texel value is equal to the minimum value and a single out of range texel location if the texel value is more than the minimum value; and
   reading x and y values from the second buffer and copying the x and y values to x and y values of the third buffer via a replace raster operation to compute a location of minimum value or a maximum value within the data set.

22. A computer system comprising:
   a memory;
   a processing device, coupled to the memory, wherein the processing device is to:
   receive, from a first buffer, a data set of texels, wherein the data set has a dimensionality D of at least two and wherein each texel contains a value;
   sort the data set into a point list of coordinates, wherein a point in the point list corresponds to a texel location in the data set;
   reduce the dimensionality of the point list by arranging points in the point list according to an N−1 dimensional dominancy, wherein reducing the dimensionality of the point list comprises performing a vertex shader pass to inform a subsequent pixel shader pass of destination bin locations;
   perform a raster operation on each associated value of the arranged points in the destination bin locations to obtain at least one value;
   output the at least one value to a second buffer; and
   repeat said sorting, reducing, performing, and outputting until D is one.

23. The system of claim 22, wherein the processing device is a graphics processing unit.

24. The system of claim 22, wherein the processing device is further to transmit the at least one value to one or more downstream devices for use in video processing applications.

* * * * *